US00RE38594E1

(19) United States
(12) Reissued Patent
Murata et al.

(10) Patent Number: US RE38,594 E
(45) Date of Reissued Patent: Sep. 21, 2004

(54) MAGNETIC SENSING APPARATUS HAVING A CENTRAL CORE WITH WIRE THERETHROUGH

(75) Inventors: Akio Murata, Suita (JP); Akio Kuroe, Katano (JP); Sayuri Muramatsu, Hirakata (JP)

(73) Assignee: Matsushita Electric Industrial Co., Ltd., Osaka

(21) Appl. No.: 10/016,151

(22) Filed: Nov. 2, 2001

Related U.S. Patent Documents

Reissue of:
(64) Patent No.: 5,978,186
Issued: Nov. 2, 1999
Appl. No.: 08/800,155
Filed: Feb. 13, 1997

(30) Foreign Application Priority Data

Mar. 14, 1996 (JP) ..... 8-057476
Apr. 8, 1996 (JP) ..... 8-085459

(51) Int. Cl.[7] ..... G11B 5/17; G11B 5/31
(52) U.S. Cl. ..... 360/123; 360/126
(58) Field of Search ..... 360/123, 124, 360/125, 126

(56) References Cited

U.S. PATENT DOCUMENTS 3,150,358 A * 9/1964 Newman et al. ..... 360/123
3,881,194 A * 4/1975 Heaslett et al. ..... 360/123
4,423,450 A * 12/1983 Hamilton ..... 360/123
4,672,493 A * 6/1987 Schewe ..... 360/125
4,787,003 A * 11/1988 Nakamura et al. ..... 360/123
5,153,796 A * 10/1992 Gooch ..... 360/125
5,181,149 A * 1/1993 Katsumata et al. ..... 360/119
5,210,668 A * 5/1993 Sillen et al. ..... 360/120

FOREIGN PATENT DOCUMENTS

JP 3-050806 * 3/1991
JP 7-176008 * 7/1995
JP 7-182627 * 7/1995

* cited by examiner

*Primary Examiner*—Craig A. Renner
(74) *Attorney, Agent, or Firm*—Alkin Gump Strauss Hauer & Feld LLP

(57) ABSTRACT

A magnetic [head] *sensing apparatus* includes a first, second and third magnetic core of a soft magnetic film formed by a thin film forming method. One end of the first and second magnetic core face a magnetic [recording medium and are disposed with a predetermined distance therebetween] *field*. The third magnetic core is disposed between the first and second magnetic cores. [A conductive coil is wound around the third magnetic core.] A conductive wire passes through the third magnetic core and is insulated therefrom. A DC-biased high-frequency constant current flows through the conductive wire to [reproduce information recorded on the magnetic recording medium. Also, a recording signal is applied to the conductive coil] *sense the magnetic field.*

4 Claims, 21 Drawing Sheets

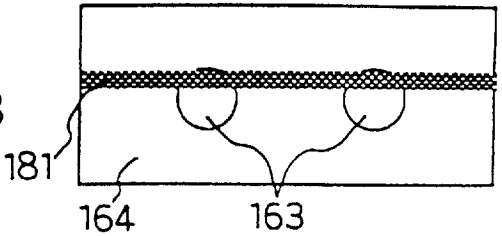
FIG. 21A
FIG. 21B
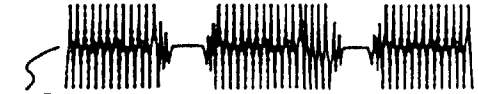
FIG. 21C
FIG. 21D
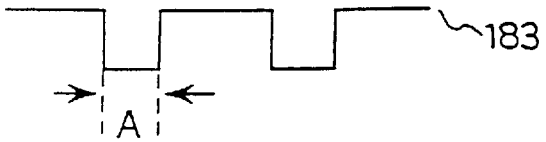
FIG. 21E
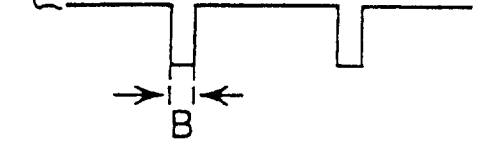
FIG. 21F

MAGNETIC SENSING APPARATUS HAVING A CENTRAL CORE WITH WIRE THERETHROUGH

Matter enclosed in heavy brackets [ ] appears in the original patent but forms no part of this reissue specification; matter printed in italics indicates the additions made by reissue.

BACKGROUND OF THE INVENTION

The present invention relates to a magnetic head for reproducing information recorded at high density and a method of producing the magnetic head, and a magnetic recording and reproducing apparatus comprising the magnetic head, as well as a perpendicular magnetic recording medium, such as a video disc or a hard disk, and a method of producing the medium.

A magnetic recording and reproducing apparatus is available in various types, such as a tape recorder, a video tape recorder and a magnetic disc apparatus. The magnetic recording and reproducing apparatus is evolving so as to carry out high-density recording and have been improved in many ways to achieve the purpose. These improvements are: a track is made narrower by using a narrower head; a plurality of magnetic heads are used; a recording medium is made smoother and thinner; the relative speed between the magnetic head and the recording medium is increased; and so on.

Accordingly, there is a need for a magnetic head capable of recording information on a magnetic recording medium at high density and also capable of reproducing the information. To meet such a need, a complex MR head comprising an MR (magneto-resistance) head, which is a reproduction-only head having a higher reproduction sensitivity than that of a widely used induction type head, has become commercially available. The complex MR head is provided with both the MR head and a conventional induction thin-film head. The MR head having high reproduction sensitivity is used in reproduction, and the conventional induction thin film head is used in recording. The MR head comprises a magneto-resistance effect device (hereinafter referred to as an MR device). However, the structure of the complex MR head comprising the MR device is more complicated than that of a conventional induction head. More specifically, a shielding layer is required around the MR device, and a magnetic gap is required for reproduction. Furthermore, it is necessary to have a structure for arranging an MR film so that the MR film can have a single magnetic domain, and it is also necessary to have a unique structure for applying a bias magnetic field for linear reproduction.

For these reasons, advanced production technology is required for producing the complex MR head, thereby making it difficult to attain high yield.

Longitudinal recording, wherein magnetization is performed in the direction parallel to the track of a recording medium, has been used as a recording method for a conventional magnetic recording and reproducing apparatus. However, in the case of the longitudinal recording, micro magnetic domains magnetized in the direction parallel to the surface of a recording film repels adjacent magnetic domains, and they tend to mutually weaken magnetization. This tendency becomes more significant as recording density is higher, thereby causing a limitation in high-density recording.

Perpendicular magnetic recording, wherein magnetization is performed in the direction perpendicular to the surface of a recording medium, is available as a method of solving the above-mentioned problem. A perpendicular magnetic recording median having a two-layer structure has been commercially available as a recording medium for performing recording in accordance with perpendicular magnetic recording. In the perpendicular magnetic recording medium, a soft magnetic film having a high permeability is used as a foundation layer. A perpendicular recording film having an axis of easy magnetization in the direction perpendicular to the surface of the soft magnetic film is laminated on the foundation layer. The soft magnetic film is made of a nickel-iron alloy (Ni—Fe) or the like, and the perpendicular recording film is made of a cobalt-chromium alloy (Co—Cr) or the like. These films are formed by sputtering or the like. When these films are formed, it is desired that the soft magnetic film and the perpendicular recording film are continuously formed in a vacuum chamber so as to prevent contamination caused by entry of dust or by formation of oxidized films between the soft magnetic film used as the foundation layer and the perpendicular recording film. In this case, the sputtering process is conducted while the substrate of a recording medium passes over two kinds of target materials in sequence at a predetermined speed.

The soft magnetic film, namely, the foundation layer, allows the recording magnetic field from the perpendicular magnetic head for perpendicularly magnetizing the perpendicular recording film to pass in the longitudinal direction parallel to the surface of the recording medium and to return to the perpendicular magnetic head. In addition, the soft magnetic film has a role to enhance the efficiency of magnetic field generation in record and reproduction. Therefore, controlling the anisotropy of the soft magnetic film is important to enhance record and reproduction characteristics. In other words, it is necessary to align the axis of hard magnetization, which is orthogonal to the axis of easy magnetization of the soft magnetic film, in the traveling direction of the substrate in record and reproduction. In the case of a magnetic disc, it is necessary to align the axis of hard magnetization of the soft magnetic film in the direction parallel to the circumference of the disc, since a recording track is formed in the direction along the circumference thereof.

A method of forming a soft magnetic film by controlling the angle between the target material and the substrate and a method of forming a soft magnetic film by applying a magnetic field have been proposed as control methods of the anisotropy of the soft magnetic film. Furthermore, a method of applying a magnetic field after the soft magnetic film was formed and before the perpendicular recording film is formed has also been proposed (Japanese Laid-open Patent Application Hei 5-258274). A method of applying a magnetic field in the radial direction of the magnetic disc has been proposed as a method of aligning the axis of hard magnetization of the soft magnetic film in the direction parallel to the circumference of the magnetic disc. In all these methods, processing is carried out before or while the perpendicular recording film is formed.

When a magnetic field is applied to a perpendicular magnetic recording medium in a vacuum, difficult problems are caused in handling; for example, a complicated mechanism must be provided and operated in a vacuum sputtering apparatus. For easier handling, it is desired that a magnetic field is applied by using an apparatus which is separate from the sputtering apparatus and provided in the atmosphere. However, since it is desired that the soft magnetic film and the perpendicular recording film are continuously formed in a vacuum as described above, sputtering is performed by passing the substrate over two target materials in a vacuum at a predetermined speed.

In a currently available sputtering apparatus, however, in order to apply the magnetic field to the magnetic disc in the radius direction before forming of the perpendicular recording film, the sputtering process must be interrupted once after the soft magnetic film is formed, and the perpendicular magnetic recording medium must be taken out to the atmosphere. In case the continuity of the film forming process is lost as described above, there is the danger of contaminating the recording medium because of entry of dust or formation of oxidized films between the foundation layer and the perpendicular recording film. Besides, sputtering must be performed twice for the foundation layer and the perpendicular recording film layer, thereby increasing the number of steps, lowering productivity, and increasing production cost.

Other problems encountered in high-density record and reproduction are caused by tracking control methods. According to one of the methods, in order to perform tracking control for a predetermined track of a magnetic disc, markers are formed on the recording medium by a physical process using etching or the like, and servo control is activated by using laser beams reflected from the markers. As a method of placing the markers, pits and projections are formed by processing the surface of the medium by a physical process such as photolithography or the like. However, this method causes high production cost. Furthermore, in the case that the method is used for hard disk drives (HDD), the floating condition of the head is changed by the pits and projections in high-density recording, and the head might be damaged in an extraordinary case.

BRIEF SUMMARY OF THE INVENTION

Accordingly, an object of the present invention is to provide a magnetic head being relatively simple in structure and superior to a conventional induction head in reproduction sensitivity, a method of producing the magnetic head, and a magnetic recording and reproducing apparatus comprising the magnetic head.

Another object of the present invention is to provide a method of properly producing a perpendicular magnetic recording medium superior in record and reproduction characteristics by taking fewer number of steps. This can be achieved by generating longitudinal magnetic anisotropy in the low coercive force layer of a foundation layer via the application of heat and a magnetic field after formation of a perpendicular recording film, and by aligning the axis of hard magnetization of the low coercive force layer in the traveling direction of a substrate in record and reproduction.

Furthermore, in a perpendicular magnetic recording medium comprising a transparent nonmagnetic substrate and a low coercive force layer of amorphous, soft magnetic portions are made nonmagnetic when portions of the amorphous layer are crystallized by applying a laser beam from the nonmagnetic substrate after formation of the magnetic recording layer. As a result, the nonmagnetic portion has a characteristic close to that of a single layer film, and a perpendicular magnetic recording medium capable of distinguishing between a signal recorded portion and a servo signal detection portion can be obtained without losing the smoothness of the surface. A still another object of the present invention is to provide a magnetic recording and reproducing apparatus which uses the above-mentioned magnetic recording medium.

In order to achieve the above-mentioned objects, the magnetic head of the present invention comprises a first magnetic core and a second magnetic core, each comprising a soft magnetic film and one end of each facing a magnetic recording medium; a third magnetic core disposed between the first and second magnetic cores, magnetically connected to the other ends of the first and second magnetic cores, and having a thickness smaller than the first and second magnetic cores; a conductive wire passing through the third magnetic core while being insulated from the third magnetic core; and a conductive coil wound around the third magnetic core.

The magnetic head of the present invention is configured so as to arrange the conductive wire passing through the third magnetic core while being insulated from the third magnetic core to a perpendicular head of a main magnetic pole exciting type including auxiliary magnetic poles having the first and second magnetic films, a main magnetic pole having the third magnetic core and a coil for generating record signal magnetic field. Therefore, the magnetic head has a structure capable of performing perpendicular magnetic recording, thereby being capable of performing record and reproduction at higher density. Moreover, since the conductive wire is disposed so as to pass through the third core while being insulated from the third magnetic core, the third magnetic core is used as a magnetic impedance element. This makes it possible to perform reproduction which uses a magnetic impedance effect and is higher in sensitivity than that in reproduction attained by conventional heads.

In addition, since the head of the present invention is a magnetic flux responsive type similar to the MR head, the head can meet the need for reduction in the moving speed of a magnetic recording medium because of miniaturization of recording and reproducing apparatuses.

The third magnetic core comprises first and second soft magnetic films, and the area of an end surface of each of the first and second soft magnetic films, facing the magnetic recording medium, is smaller than the area of the other end surface. As a result, the magnetic flux density at the end surface facing the magnetic recording medium becomes higher, and the intensity of recording magnetization increases.

Since the third magnetic core comprises the first and second soft magnetic films, the magnetic head can be produced by using the pattern forming method.

The method of producing the magnetic head of the present invention comprises a step of forming the first soft magnetic layer, a step of forming a first insulation layer on the first soft magnetic layer, a step of pattern forming first conductive layers on the first insulation layer, a step of forming a second insulation layer on the conductive layers, a step of forming the second soft magnetic layer on the second insulation layer, a step of forming a second conductive layer of line-shape for a conductive wire on the second soft magnetic layer, a step for forming a third soft magnetic layer on the second soft magnetic layer so as to put the second conductive layer between the second and third soft magnetic layers, a step of forming a third insulation layer on the third soft magnetic layer, a step of forming third conductive layers on the third insulation layer so as to compose of a conductive coil by connecting with the first conductive layers, a step of forming a fourth insulation layer on the third conductive layers, and a step of forming a fourth soft magnetic layer on the fourth insulation layer.

Since the conductive layer can be formed by the pattern formation method, the magnetic head can be produced easily.

The magnetic recording and reproducing apparatus of the present invention uses the above-mentioned magnetic head, and is provided with carrier signal application means for applying to the conductive wire a high-frequency signal having a constant current on which a DC current for a bias magnetic field is superimposed.

Since recorded information is reproduced on the basis of a high-frequency voltage detected by a magnetic field obtained by a bias magnetic field superimposed on an external magnetic field, the reproduction sensitivity of the head is higher than that of a conventional induction head.

Furthermore, the reproduction means comprises a high-frequency voltage detection portion for detecting a high-frequency voltage generated across the conductive wire and changed on the basis of the high-frequency signal having the constant current depending on a magnetic field obtained by the bias magnetic field superimposed on an external magnetic field caused by the magnetic recording medium, and an AM demodulation portion for amplitude-demodulating a detected high-frequency voltage.

The recorded information can be reproduced easily by AM-demodulating the detected high-frequency voltage.

A perpendicular recording medium of the present invention is obtained by sequentially forming a low coercive force magnetic layer of a magnetic thin film and a perpendicular magnetic recording layer having an axis of easy magnetization in the direction perpendicular to the recording layer on a nonmagnetic substrate. By applying heat and a magnetic field after the formation of the perpendicular magnetic recording layer, longitudinal magnetic anisotropy is generated in the low coercive force magnetic layer, and the axis of hard magnetization is aligned in the traveling direction of the substrate in record and reproduction.

By applying a magnetic field while heating the low coercive force magnetic layer to a predetermined temperature after the formation of the low coercive force magnetic layer and the perpendicular magnetic recording layer, longitudinal magnetic anisotropy is generated on the soft magnetic film. The axis of hard magnetization is thus aligned in the traveling direction of the substrate in record and reproduction. Consequently, the permeability of the low coercive force magnetic layer increases in the traveling direction of the substrate. Therefore, the intensity of the magnetic field increases during recording wherein a magnetic field is generated in the same direction as the traveling direction of the substrate. This increases the intensity of the residual magnetic field of the perpendicular magnetic recording layer, and raises the output level of a reproduction signal.

The perpendicular magnetic recording medium of the present invention is produced as described below. A circular plate used as a jig on which a perpendicular magnetic recording medium is placed is heated, and the temperature thereof is detected and controlled so as to have a constant value. While a magnetic field is applied by using a magnet in the radial direction of the perpendicular recording medium, the circular plate is rotated so that longitudinal magnetic anisotropy is generated at the low coercive force magnetic layer. In other words, after the formation of the soft magnetic film and the perpendicular recording film of the perpendicular magnetic recording medium, a magnetic field is applied to the soft magnetic film while the film is heated to a predetermined temperature in the atmosphere. As a result, longitudinal magnetic anisotropy is generated at the soft magnetic film, and the axis of hard magnetization thereof is aligned to the traveling direction of the substrate in record and reproduction. Consequently, the method can be conducted more easily than a conventional method of applying a magnetic field in a vacuum. Since the soft magnetic film and the perpendicular recording film are continuously formed by sputtering, the perpendicular magnetic recording medium can be obtained at higher productivity and a lower cost.

Furthermore, a low coercive force magnetic layer having an amorphous magnetic thin film, and a perpendicular magnetic recording layer having an axis of easy magnetization in the direction perpendicular to the surface thereof are sequentially formed on the nonmagnetic substrate of the perpendicular magnetic recording medium. Portions of the amorphous film are then crystallized. In other words, by forming the low coercive force magnetic layer of the perpendicular magnetic recording medium from an amorphous material, and by applying a laser beam to portions of the layer so as to crystallize the portions, the portions can be used as markers for servo control.

Furthermore, in the perpendicular magnetic recording medium, the low coercive force magnetic layer comprising the amorphous magnetic thin film is made of an amorphous alloy (Co—Zr—Ta) containing cobalt, zirconium and tantalum.

The record and reproduction characteristics of the head can be improved by using the soft magnetic film made of the amorphous Co—Zr—Ta material.

In the perpendicular magnetic recording medium, the crystallized portions of the low coercive force magnetic layer comprising the amorphous material are used for plural kinds of servo control.

In particular, the crystallized portions of the amorphous soft magnetic film of the perpendicular magnetic recording medium are used for servo control. Since the crystallized portions have no pits or projections, the surface of the disc can be maintained smooth.

In the method of producing the perpendicular magnetic recording medium in accordance with the present invention, a thin film magnetic recording layer of low coercive force made of an amorphous material, and a perpendicular magnetic recording layer having an axis of easy magnetization in the direction perpendicular to the surface of the layer are sequentially formed first on a nonmagnetic transparent substrate. After the magnetic recording layer is formed, a laser beam is applied for the nonmagnetic substrate so as to crystallize portions of the thin film magnetic recording layer made of an amorphous material.

Since a laser beam is applied to the side of the nonmagnetic substrate after providing the amorphous low coercive force magnetic layer and the perpendicular magnetic recording layer on the nonmagnetic transparent substrate, the perpendicular magnetic recording medium having desired crystallized portions in the amorphous film can be produced without losing the continuity in the sputtering process of producing the amorphous film and the perpendicular recording film.

The magnetic head of the present invention comprises magnetic cores and a magnetic yoke, each including a soft magnetic thin film, and the magnetic cores and the magnetic yoke form a closed magnetic circuit via the above-mentioned perpendicular magnetic recording medium. In addition, the magnetic head has a second winding for recording and reproducing signals, and another winding for causing a change in impedance and detecting the change.

Furthermore, the magnetic head has a winding for recording and reproducing signals, and another winding for detecting a change in impedance so as to accurately control the position of the head.

The magnetic recording and reproducing apparatus of the present invention comprises the above-mentioned magnetic head moving relative to the above-mentioned perpendicular magnetic recording medium so as to record and reproduce signals, drive means for moving the magnetic head in the horizontal direction along the surface of the magnetic recording medium, drive means for moving the magnetic head in the direction perpendicular to the magnetic head so as to finely adjust the distance between the magnetic recording medium and the magnetic head, record signal supplying means for supplying record signals to the magnetic head, and means for detecting noncrystallized portions and crystallized portions of the amorphous layer of the magnetic recording medium depending on a change in impedance of the winding of the magnetic head at the time of application of a high-frequency voltage to the winding, and control drive means for detecting the change in the impedance of the winding and for tracking the magnetic head so that the detection signal level corresponding to the impedance value becomes maximum.

The magnetic recording and reproducing apparatus comprises means for detecting noncrystallized portions and crystallized portions of the amorphous layer of the medium by detecting a change in the impedance of the winding during reproduction, and control drive means for tracking the magnetic head along a locus where signals have been recorded so that the level of the detection signal becomes maximum.

The noncrystallized portions and crystallized portions of the amorphous soft magnetic layer are detected as a change in the impedance of the winding of the head, and servo control is carried out depending on a change in output voltage on the basis of the change in impedance. As a result, tracking can be carried out accurately.

During reproduction, the noncrystallized portions and crystallized portions of the amorphous layer are detected as a change in the impedance of the winding of the head, and the head is controlled so that the detected reproduction output is as high as possible, whereby tracking can be carried out highly accurately.

In the production of the perpendicular magnetic recording medium of the present invention, the sputtering process for the low coercive force magnetic layer used as a foundation layer and the sputtering process for the perpendicular magnetic recording layer are carried out continuously. After the formation of the perpendicular magnetic recording layer, heat and a magnetic field are applied so as to generate longitudinal magnetic anisotropy at the low coercive force magnetic layer. The axis of hard magnetization is aligned in the traveling direction of the substrate in record and reproduction. Consequently, it is possible to provide a magnetic recording medium having proper record and reproduction characteristics.

The magnetic recording apparatus of the present invention uses a magnetic recording medium wherein a low coercive force magnetic layer comprising an amorphous magnetic thin film and a perpendicular magnetic recording layer having an axis of easy magnetization in the direction perpendicular to the surface of the film are formed in this sequence on a nonmagnetic substrate. A laser beam is applied to portions of the amorphous layer so as to heat and crystallize the portions so that the layer becomes a nearly single layer film comprising only the perpendicular magnetic recording layer while the smooth surface of the disc is maintained. During recording, a tracking signal can be detected by detecting the crystallized portions and the amorphous portions which has not been irradiated with the laser beam.

BRIEF DESCRIPTION OF THE SEVERAL VIEWS OF THE DRAWING

FIG. 21A is a plan view showing part of the disc and illustrating the tracking principle of the disc in accordance with the third embodiment of the present invention;

FIG. 21B is a plan view showing part of the disc and illustrating the tracking principle of the disc in accordance with the third embodiment of the present invention;

FIG. 21C is a waveform diagram showing the detection output of the head during tracking shown in FIG. 21A;

FIG. 21D is a waveform diagram showing the detection output of the head during tracking shown in FIG. 21B;

FIG. 21E is a detected envelop waveform diagram showing the detection output shown in FIG. 21C; and FIG. 21F is a detected envelop waveform diagram showing the detection output shown in FIG. 21D.

DETAILED DESCRIPTION OF THE INVENTION

Embodiments in accordance with the present invention will be described below referring to FIG. 1 to FIG. 21F.

[First Embodiment]

Figure 1:
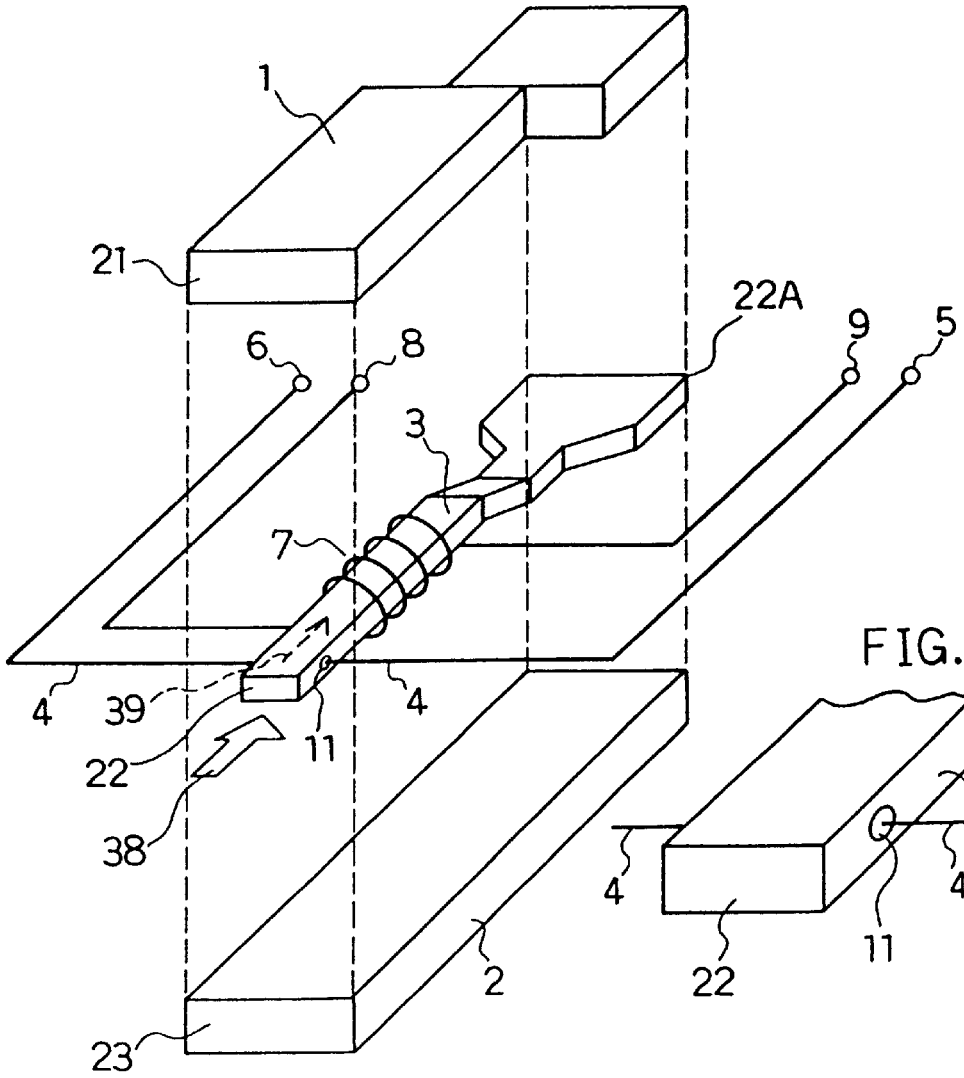
FIG. 1 is an exploded perspective assembly view showing a magnetic head in accordance with a first embodiment of the present invention.

First, a magnetic head in accordance with a first embodiment of the present invention is described below referring to FIG. 1 to FIG. 4. FIG. 1 is an exploded perspective assembly view showing the basic structure of the magnetic head of the present invention. In FIG. 1, the magnetic head comprises a magnetic core 1, a magnetic core 2, a magnetic core 3, a conductive wire 4, terminals 5 and 6 connected to both ends of the conductive wire 4, a conductive coil 7, and terminals 8 and 9 for applying a signal for generating a record signal magnetic field to the conductive coil 7.

The magnetic core 1 and the magnetic core 2 are soft magnetic thin films made of a known Ni—Fe alloy. The composition ratios (weight ratios) of the Ni and Fe in the Ni—Fe alloy are preferably 80% and 20%, respectively. The conductive coil 7 comprises a copper (Cu) thin film disposed between the magnetic core 1 and the magnetic core 2 and is wound around the magnetic core 3 in a helical form. The thickness of the magnetic core 3 is made smaller than those of the magnetic core 1 and the magnetic core 2. The area of the end surface 22 of the magnetic core 3, being disposed so as to face a magnetic medium, is made smaller than the area of the other end surface 22A of the magnetic core 3.

Figure 1A:
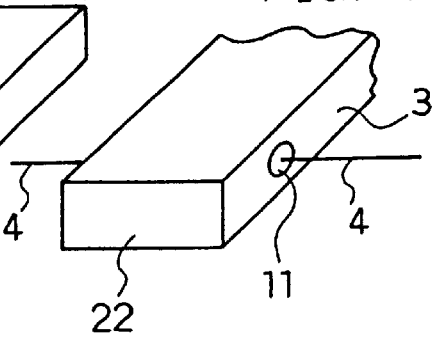
FIG. 1A is a partially enlarged view showing a magnetic core 3.

As shown in the partially enlarged view of FIG. 1A, the conductive wire 4 is disposed so as to pass through the magnetic core 3, and comprising a copper (Cu) film or the like, just as in the case of the conductive coil 7. However, an insulation portion 11 is provided between the conductive wire 4 and a hole in the magnetic core 3 so as to electrically insulate the conductive wire 4 from the magnetic core 3.

The terminals 5 and 6 are connected to both ends of the conductive wire 4, respectively, and via the terminals 5 and 6, a constant AC current described below flows through the conductive wire 4.

Figure 2:
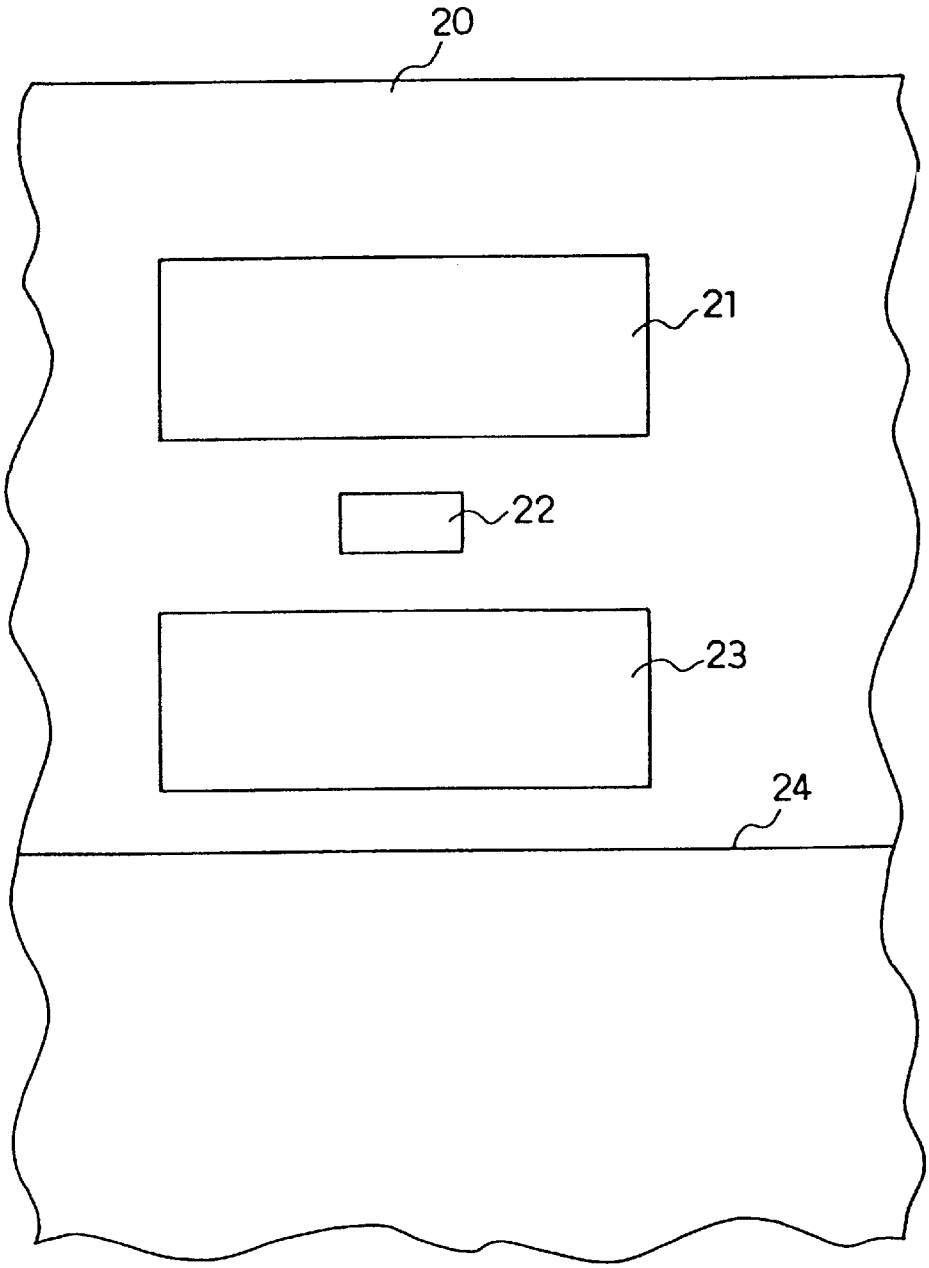
FIG. 2 is a front view showing the medium-facing surface of the magnetic head in accordance with the first embodiment of the present invention.

FIG. 2 is a front view showing the magnetic head's surface facing a magnetic recording medium (not shown). The end surfaces 21, 23 and 22 of the magnetic cores 1, 2 and 3, respectively, are formed so as to keep predetermined intervals and be flush with one another. In FIG. 2, the magnetic head has a protective film 20 and a substrate 24; these are not shown in FIG. 1. The substrate 24 is made of nonmagnetic ceramics, and the protective film 20 is obtained by forming an $Al_2O_3$ film.

Figure 3:
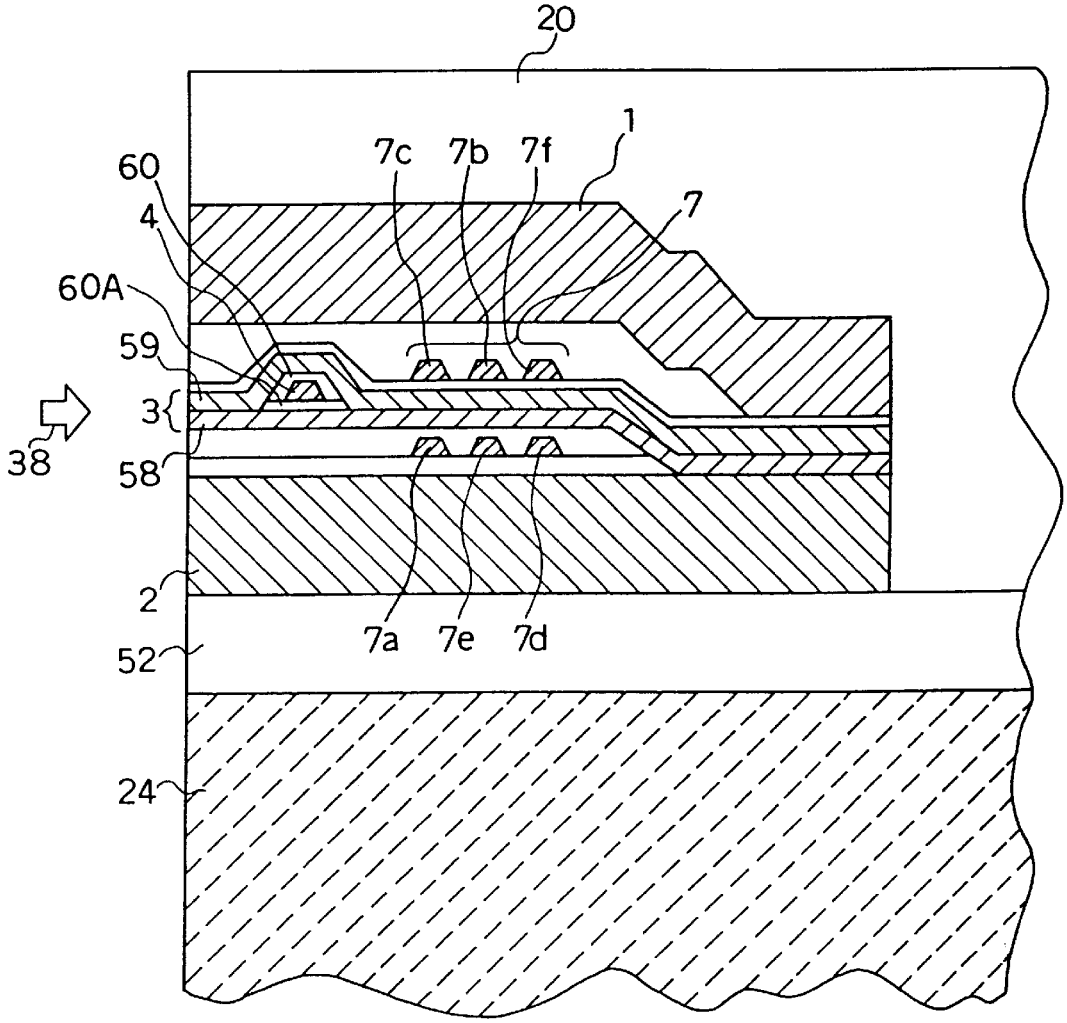
FIG. 3 is a sectional view showing the magnetic head in accordance with the first embodiment of the present invention.

FIG. 3 is a sectional view of the magnetic head of the present embodiment, which is configured by using all the elements thereof comprising thin films. In FIG. 3, an oxide insulation film 52 is formed on the substrate 24. On the oxide insulation film 52, the magnetic cores 2, 3 and 1 are formed by thin film forming technology. Conductive coils 7a and 7b, portions of the conductive coil 7, are connected to each other and helically wound around the magnetic core 3. In the same way, conductive coils 7e and 7f are connected to each other and helically wound around the magnetic core 3. A conductive coil 7c is connected to the terminal 8 shown in FIG. 1, and a conductive coil 7d is connected to the terminal 9 shown in FIG. 1. In addition, the magnetic core 3 comprises a first magnetic film 58 and a second magnetic film 59. The conductive wire 4 is formed between the magnetic films 58 and 59.

Figure 4:
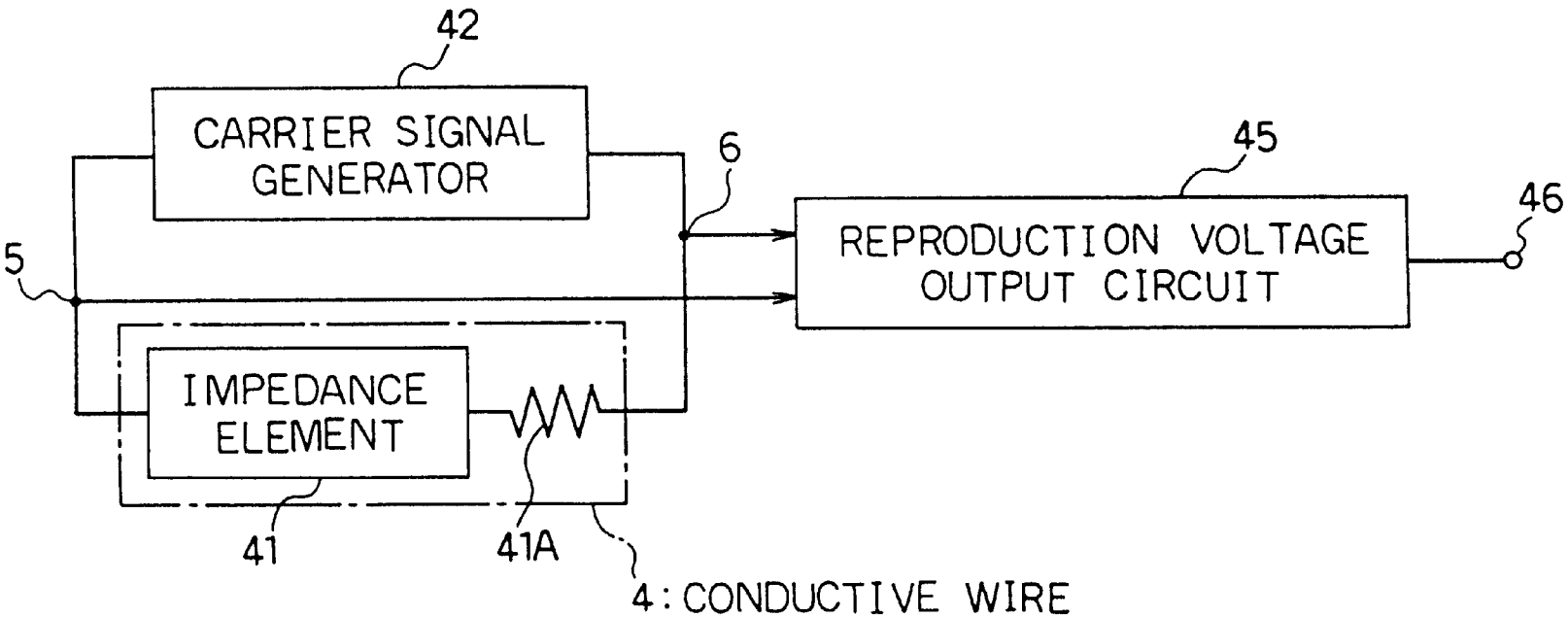
FIG. 4 is an equivalent circuit diagram of the magnetic head in accordance with the first embodiment of the present invention.

FIG. 4 is an equivalent circuit diagram of a magnetic reproducing apparatus including the magnetic head shown in FIG. 1. This equivalent circuit comprises an impedance element 41, a resistor 41A, a carrier signal generator 42 and a reproduction voltage output circuit 45.

The impedance element 41 is an equivalent impedance element representation of the conductive wire 4 of the magnetic head shown in FIG. 1. The carrier signal generator 42 is connected across the terminal 5 and the terminal 6 of the conductive wire 4. To the impedance element 4, the carrier signal generator 42 applies a carrier signal having an AC constant current on which a DC current for a DC bias is superimposed. The reproduction voltage output circuit 45 measures a voltage generated between the terminal 5 and the terminal 6, and delivers the voltage from a terminal 46.

When the magnetic core 3 shown in FIG. 1 is located at a position of magnetization of the magnetic information of a magnetic recording medium (not shown), indicated by arrow 38 (hereinafter referred to as magnetization 38), a magnetic flux indicated by arrow 39 (hereinafter referred to as magnetic flux 39) passes through the inside of the magnetic core 3. The magnetization 38 is a vector representation of magnetization of magnetic information stored in a magnetic recording medium. The direction of the magnetization 38 is the same as that of magnetization by a perpendicular magnetic recording medium. The existence of the magnetic flux 39 indicates that part of leakage flux from the above-mentioned magnetization 38 passes through the inside of the magnetic core 3. At this time, the magnetic core 3 is magnetized by the magnetic flux 39, thereby lowering the permeability of the magnetic core 3, that is, the permeability of the first magnetic film 58 and the second magnetic film 59 shown in FIG. 3. In other words, this condition is equivalent to a condition wherein the impedance of the impedance element 41 shown in FIG. 4 is lowered. Since an AC constant current flows through the conductive wire 4 at this time, a counter electromotive voltage proportional to the impedance is generated across the terminals 5 and 6. As a result, the voltage delivered from the reproduction voltage output circuit 45 is proportional to the impedance value, that is, the permeability of the conductive wire 4. Furthermore, the voltage inversely proportional to the amount of the influent magnetic flux 39, that is, inversely proportional to the intensity of the magnetization 38, is delivered from the reproduction voltage output circuit 45. This results in the so-called magnetic flux responsive reproduction.

To increase the voltage to be delivered, it is preferable that the impedance of the impedance element 41 is high. In addition, it is desired that magnetic responsiveness represented by a change in impedance with respect to an external magnetic field is high. Accordingly, the permeability of the magnetic core 3 should be higher, and the frequency of a carrier signal should be as high as possible.

The recording operation of the magnetic head of the present embodiment is the same as that of a well-known main magnetic pole excitation perpendicular head (disclosed in the Journal of the magnetics society of Japan No. 13 page,113–116 (1989), for example). The recording operation of the present embodiment is also the same as that of a conventional magnetic head.

The recording operation is briefly described below. A record signal current in accordance with recording information is fed to the coil 7 through the terminals 8 and 9 shown in FIG. 1 so as to excite the magnetic core 3. By the magnetic field generated by the excited magnetic core 3, a recording medium (not shown) is magnetized so as to record information. In addition, since the area of the end surface 22 of the magnetic core 3, facing the recording medium, is made smaller than that of the other end surface 22A, the magnetic flux density of the end surface 22 becomes high during recording, thereby increasing the intensity of recording magnetization.

As described above, it is not necessary to use separate magnetic circuits for record and reproduction in the case of the magnetic head of the present invention, unlike a conventional complex MR head which uses separate magnetic circuits for record and reproduction. In other words, the magnetic head of the present invention can use the same magnetic circuit for record and reproduction. Accordingly, despite the relatively simple structure of the magnetic head, the magnetic head of the present invention can be obtained as a magnetic flux responsive reproduction head being superior to a conventional induction head in reproduction sensitivity.

[Second Embodiment]

Figure 5A:
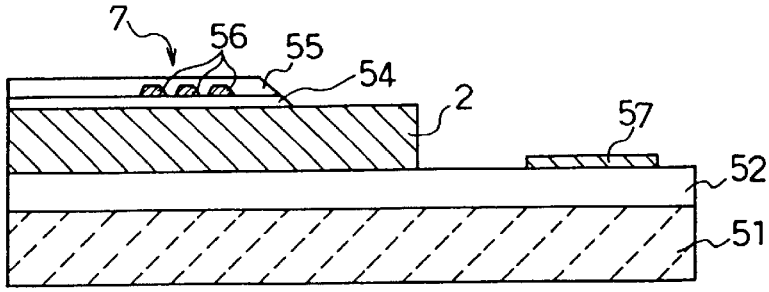
FIG. 5A is a sectional view showing a method of producing a magnetic head in accordance with a second embodiment of the present invention.

Next, the steps of the method of producing a magnetic head in accordance with a second embodiment of the present invention is described below referring to FIG. 5A to FIG. 6. FIGS. 5A, 5B, 5C and 5D are sectional views showing the steps for producing the magnetic head of the present invention. FIG. 6 shows another example wherein the configuration of an encircled portion shown in FIG. 5D is changed.

The method of producing the magnetic head in accordance with the second embodiment is described below. First, as shown by FIG. 5A, a head substrate 51 made of a nonmagnetic material is an alumina-titanium-carbide substrate in the case of the present embodiment. On the surface of the head substrate 51, an alumina film is formed by the sputtering method as an oxide insulation film 52 so as to improve flatness of the surface and insulate the head substrate 51. The magnetic core 2 is formed on the oxide insulation film 52. The magnetic core 2 is a cobalt-based (hereinafter is referred to as Co-based) amorphous film formed by the sputtering method. The Co-based amorphous film is made of a Co—Zr—Nb alloy (Co 90%, Zr 4%, Nb 6%) or the like. The magnetic core 2 can be implemented by a permalloy film formed by plating or the like, and the thickness of the film is about 3 $\mu$m. Next, an oxide insulation film 54 having a thickness of about 0.5 $\mu$m is formed on the magnetic core 2. Halves 56 of conductive coil elements are formed on the oxide insulation film 54. The halves 56 of conductive coil elements are conductive portions which are disposed around the third magnetic core 3 (FIG. 5C) in a subsequent step so as to form a helical conductive coil 7, and are Cu films having a thickness of about 1 $\mu$m formed by plating. Electrodes 57 are also formed when the halves 56 of conductive coil elements are formed. The electrodes 57 are conductive films for forming the terminals 5, 6, 8 and 9 shown in FIG. 1, and four pieces of the electrodes 57 are provided in the direction perpendicular to the paper surface.

An oxide insulation film 55 disposed around the halves 56 of conductive coil elements is a $SiO_2$ film formed by the sputtering method, and the thickness of the film is about 2 $\mu$m. The insulation film 55 is made thicker than the insulation film 54 so as to absorb pits and projections caused by level differences due to the halves 56 of conductive coil elements, thereby obtaining a smooth surface.

Figure 5B:
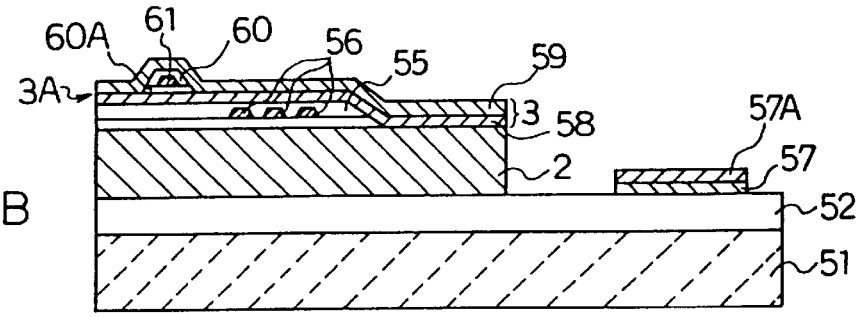
FIG. 5B is a sectional view showing the method of producing the magnetic head in accordance with the second embodiment of the present invention.
Figure 6:
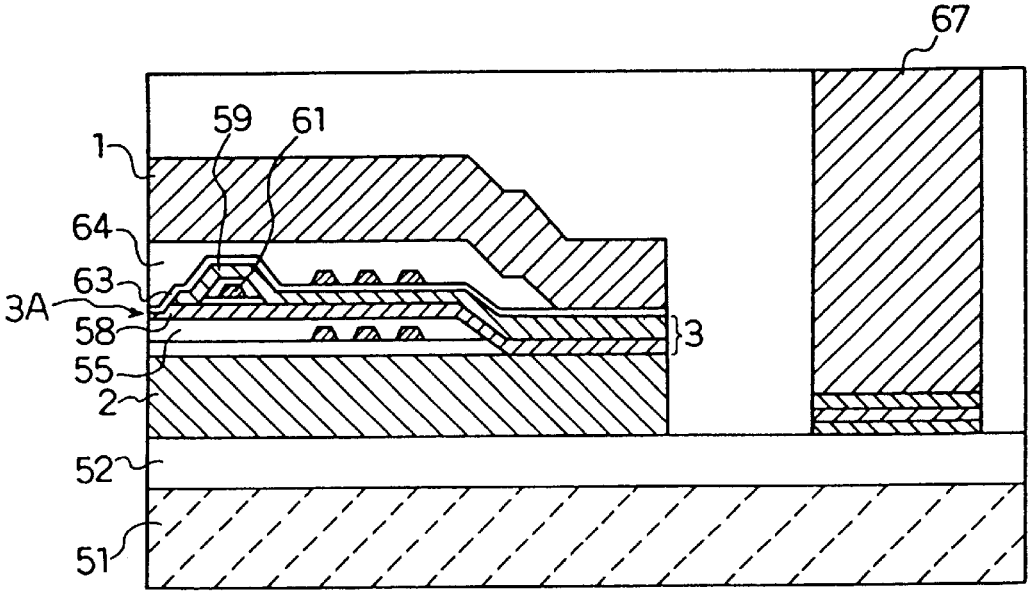
FIG. 6 is a sectional view showing a modified medium-facing surface of the magnetic head in accordance with the second embodiment of the present invention.

A subsequent step shown in FIG. 5B is then described below. Multilayer magnetic films 58 and 59 are magnetic films constituting the third magnetic core 3 and formed on the surfaces of the oxide insulation film 55 and the magnetic core 2. In a frequency range of about 100 MHz to 800 MHz, the magnetic core 3 causes a significant change in impedance in the conductive wire 4 disposed as shown in FIG. 1 in accordance with the intensity of the external magnetic field. The magnetic core 3 is a multilayer film comprising a Co-based amorphous film and a $SiO_2$ film. The multilayer magnetic films 58 and 59 magnetically make contact with the magnetic core 2 at an end opposite to an end surface 3A facing a recording medium. Furthermore, the area of the end surface 3A of the magnetic core 3, facing the recording medium, is made smaller than that of the other end surface 3B. When the multilayer magnetic films 58 and 59 are formed, the magnetic film 58 is formed first. Next, a $SiO_2$ insulation film 60A is formed near the medium-facing surface 3A of the magnetic film 58. A conductive wire 61 comprising a Cu film is formed on the $SiO_2$ insulation film 60A. When the conductive wire 61 is formed, a conductive film 57A is also formed on the electrode 57. The $SiO_2$ insulation film 60 is further formed on the conductive wire 61, and the magnetic film 59 is formed in the end. The conductive wire 61 is insulated from the multilayer magnetic films 58 and 59 by the insulation films 60A and 60. The conductive wire 61 is a conductor for flowing high-frequency signal current, and corresponds to the conductive wire 4 shown in FIG. 1. Furthermore, the insulation films 60 and 60A correspond to the insulation portion 11 shown in FIG. 1.

Figure 5C:
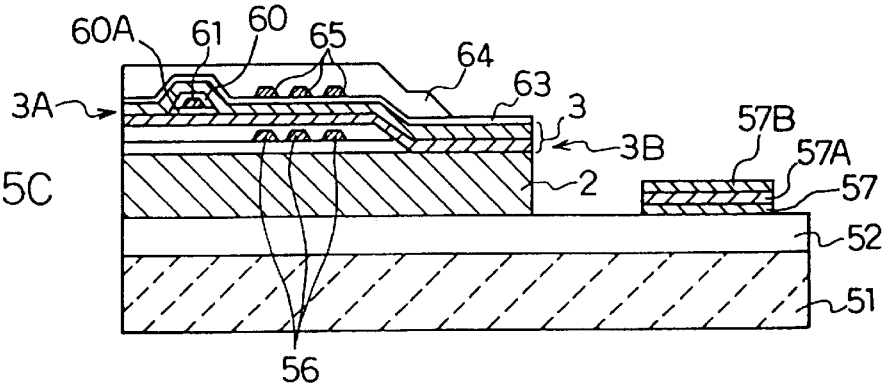
FIG. 5C is a sectional view showing the method of producing the magnetic head in accordance with the second embodiment of the present invention.
Figure 5D:
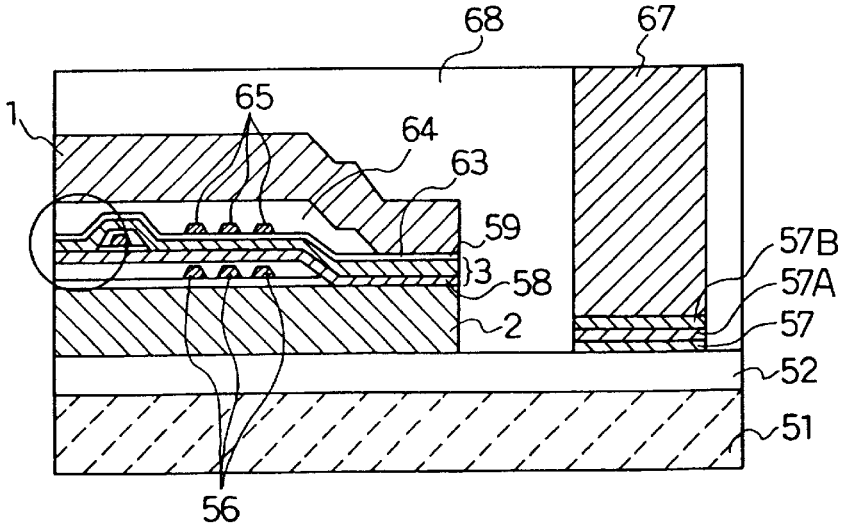
FIG. 5D is a sectional view showing the method of producing the magnetic head in accordance with the second embodiment of the present invention.

A subsequent step shown in FIG. 5C is then described below. First, an insulation film 63 is formed on the magnetic core 3. Next, a plurality of halves 65 of conductive coil elements are formed on the insulation film 63. At this time, a conductive film 57B is also formed on the conductive film 57A. The halves 65 of conductive coil elements are conductors constituting portions of a helical form and similar to those of the above-mentioned halves 56 of conductive coil elements, and are Cu films formed by the plating method. The halves 65 of conductive coil elements are formed so as to make contact with the halves 56 of conductive coil elements shown on the side surfaces of the magnetic head on the front and rear sides of the paper on which FIG. 5C is given. The helical conductive coil 7 disposed around the magnetic core 3 as shown in FIG. 1 is completed by connecting the halves 56 and 65 conductive coil elements with each other. The insulation film 63 and an insulation film 64 are $SiO_2$ films, and disposed so as to insulate the halves 65 of conductive coil elements from the third magnetic core 3 and so as to absorb pits and projections caused by level differences due to the halves 65 of conductive coil elements.

In the last step shown in FIG. 5D, a terminal 67 is first formed on the conductive film 57B of the electrode 57. As the terminal 67, a thick film is formed by plating or the like. Next, the first magnetic core 1 is formed. The first magnetic core 1 magnetically contacts the magnetic cores 2 and 3 at a right end portion in FIG. 5D. In the end, a head protection film 68 is formed by sputtering or the like on the entire surface of the head excluding a portion for the terminal 67. The surface is then subjected to lapping so as to obtain a smooth flat surface. The magnetic core 1 is the same as the magnetic core 2 in material and production method. As shown in FIG. SD, the magnetic core 3 is made thinner than the magnetic cores 2 and 1.

FIG. 6 is a sectional view showing a magnetic head modified from the head completed as shown in FIG. 5B, wherein the magnetic pole end portions of the multilayer films 58 and 59 (the portions enclosed by a circle shown in FIG. 5D) are made thinner by etching. In this magnetic head, since the area of the end surface 3A of the third core 3, facing a recording medium, decreases, the region of magnetization becomes smaller in recording, thereby raising the density of recording.

The methods of producing the layers and the materials of the layers are not limited to those described above. A Fe-based film or a Ni-based film can be used as the multilayer magnetic films 58 and 59. Besides, a variety of thin film forming methods, such as sputtering and plating, can be used as production methods.

In order to increase permeability at high frequencies, multilayer forming of the magnetic cores 2 and 1, and the adjustment of anisotropic magnetic field should also be carried out as necessary.

In addition, the material of the substrate, the material of the protection film and the methods of producing these films are not limited to those described above with respect to the present embodiment.

[Third Embodiment]

Figure 7:
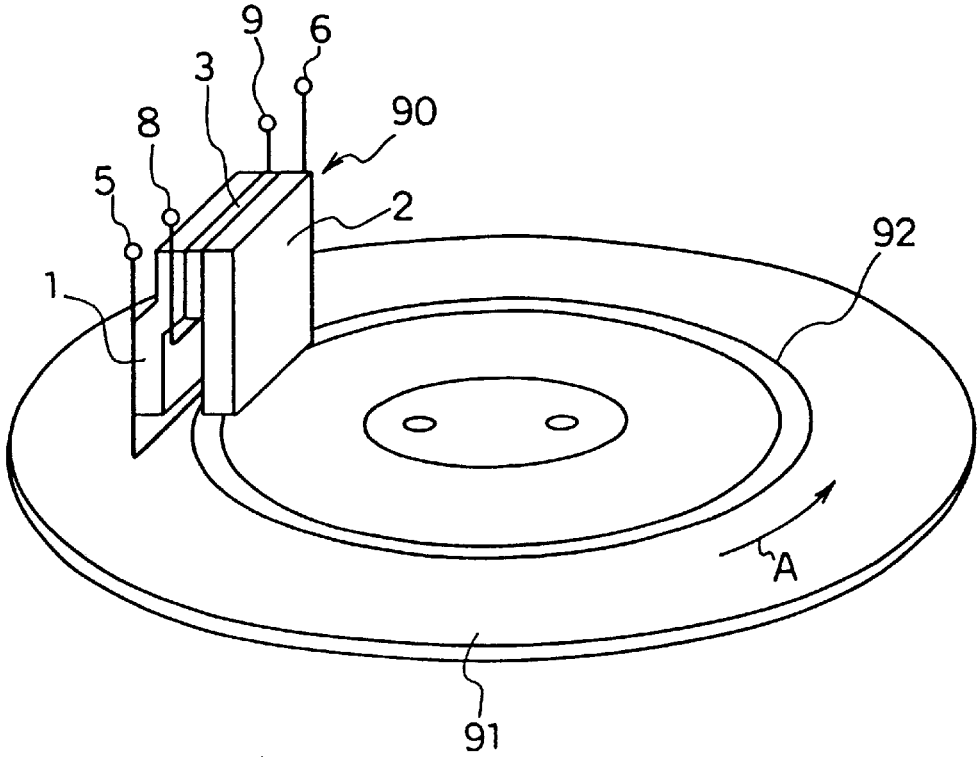
FIG. 7 is a perspective view showing a magnetic recording and reproducing apparatus in accordance with a third embodiment of the present invention.
Figure 8:
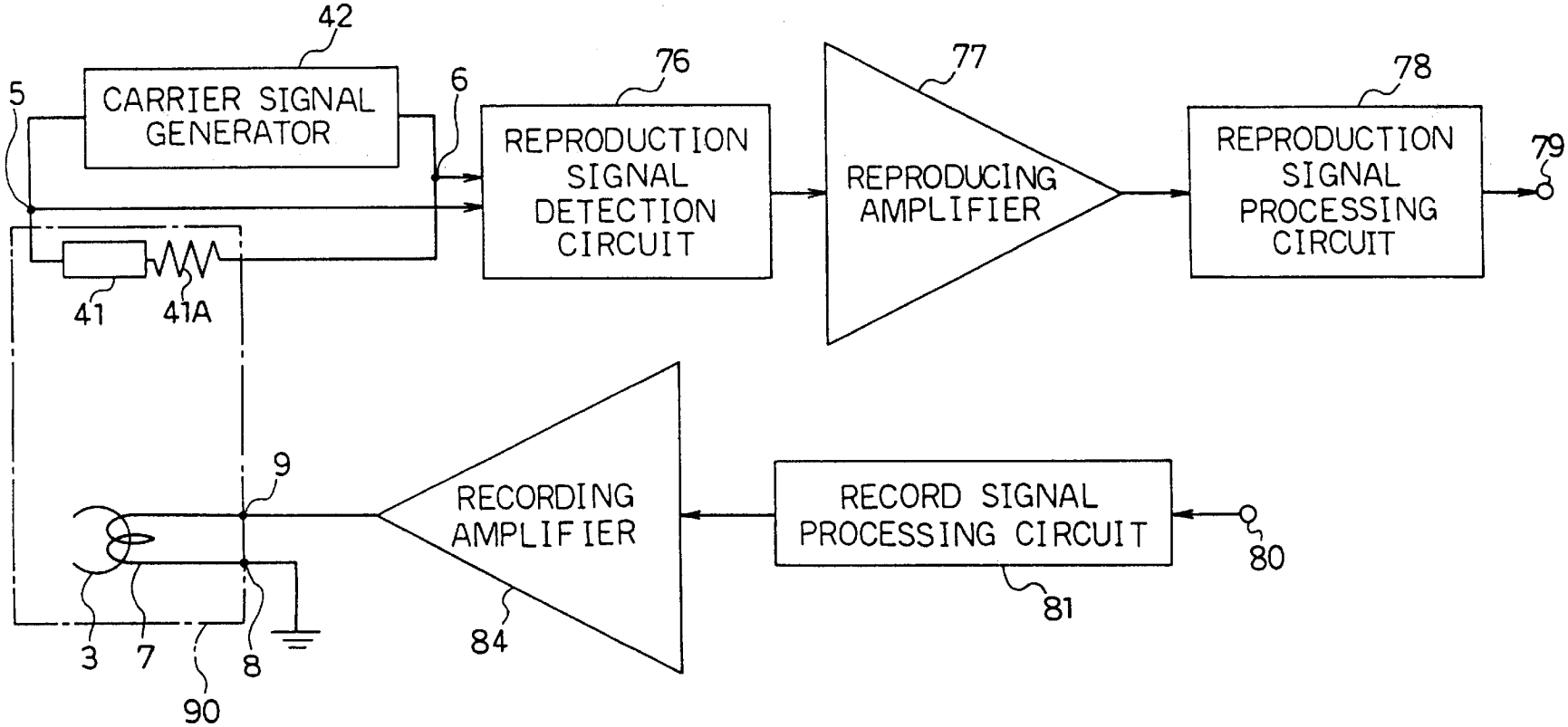
FIG. 8 is a block diagram showing the magnetic recording and reproducing apparatus in accordance with the third embodiment of the present invention.

Next, a magnetic information recording and reproducing apparatus in accordance with a third embodiment of the present invention is described below referring to FIGS. 7 and 8. FIG. 7 is a perspective view showing the magnetic information recording and reproducing apparatus of the present invention. FIG. 8 is a block diagram of a recording and reproducing circuit used for the magnetic information recording and reproducing apparatus of the present invention. In FIG. 7, a magnetic head 90 is the same as the magnetic head of the first embodiment of the present invention. The magnetic head 90 is disposed on a floating slider (not shown). The terminals 5 and 6 are connected to the respective ends of the conductive wire 4 disposed so as to pass through the third magnetic core 3 shown in FIG. 1, and be insulated from the magnetic core 3. The terminals 8 and 9 are connected to the conductive coil 7 for record signal magnetic field generation, and wound around the third magnetic core 3 of the magnetic head 90 while kept insulated from the magnetic core 3 as shown in FIG. 7. During recording, record current flows in accordance with recording information supplied externally.

A disc-like magnetic recording medium 91 is the so-called perpendicular magnetic recording medium having an axis of easy magnetization perpendicular to the recording surface of the medium. A 0.13 $\mu$m thick Co—Cr film and a 0.5 $\mu$m thick Ni—Fe film are coated as a recording layer onto a glass disc having a very smooth surface of 25 mm in diameter. In the magnetic information reproducing apparatus of the present embodiment, the disc-like magnetic recording medium 91 is rotated in the direction indicated by arrow A shown in FIG. 7 by a spindle motor (not shown) or the like. The magnetic head 90 performs record and reproduction while scanning over the disc-like medium 91. As a result, a recording track 92 is formed on the disc-like magnetic recording medium 91.

FIG. 8 is a block diagram of the recording and reproducing circuit of the present embodiment. The reproduction device of the recording and reproducing apparatus comprises the magnetic head 90, a carrier signal generator 42, a reproduction signal detection circuit 76, a reproducing amplifier 77 and a reproduction signal processing circuit 78. In addition, the recording device of the apparatus comprises a record signal processing circuit 81 and a recording amplifier 84.

FIG. 8 shows a circuit equivalent to the configuration of the magnetic head 90 of the present invention. The magnetic head 90 comprises an impedance element 41 including the third magnetic core 3 and the conductive wire 4 passing through the third magnetic core 3 while kept insulated from the magnetic core 3, the first and second magnetic cores (not shown) and the conductive coil 7. The impedance element 41 is provided with the high-frequency signal application terminals 5 and 6 shown in FIG. 1.

The carrier signal generator 42 feeds AC constant current, that is, a carrier signal on which a direct current for applying a DC bias is superimposed. The carrier signal generator 42 comprises a carrier signal oscillation circuit, a constant current drive circuit and a DC bias application circuit. The frequency of the carrier signal is 600 MHz, for example.

The reproduction signal detection circuit 76 has an AM demodulation circuit, such as an AM detection circuit. The AM detection circuit detects a signal delivered across the terminals 5 and 6. In this way, the AM demodulation circuit demodulates a supplied AM wave and delivers a signal to be reproduced.

The reproducing amplifier 77 amplifies a reproduction signal demodulated by the reproduction signal detection circuit 76.

The reproduction signal processing circuit 78 converts the reproduction signal amplified by the reproducing amplifier 77 by decoding or the like into a desired output signal. The converted signal is delivered from an output terminal 79.

The record signal processing circuit 81 receives a signal to be recorded from an input terminal 80, performs coding or the like, and converts the obtained signal into a signal suited to be recorded by the disc-like magnetic recording medium 91. The record signal processing circuit 81 is nearly similar to a generally well-known recording-related circuit of a disc apparatus, such as a recording equalizer.

The recording amplifier 84 amplifies the current level of the signal received from the record signal processing circuit.

First, the recording operation of the recording and reproducing apparatus of the present embodiment is described below referring to FIG. 7 and FIG. 8.

Information to be recorded is supplied to the record signal processing circuit 81 from the input terminal 80 shown in FIG. 8. The record signal processing circuit 81 converts the information to be recorded into a record signal having a signal format suited to be recorded by the disc-like magnetic recording medium 91. The record signal is amplified by the recording amplifier 84 and delivered to the conductive coil 7 of the magnetic head 90 as a record current. The record current flows through the conductive coil 7 shown in FIG. 1 and energizes the magnetic head 90, and the disc-like magnetic recording medium 91 is magnetized by a leakage magnetic field from the magnetic core 3. The record track 92 is formed by the magnetization of the disc-like magnetic recording medium 91.

Next, the reproduction operation of the present embodiment is described below referring to FIGS. 7 and 8. First, the magnetic head 90 shown in FIG. 7 scans the record track 92 on the disc-like magnetic recording medium 91. When the magnetic core 3 of the magnetic head 90 scans the record track 92, a leakage flux caused by record magnetization passes through the magnetic core 3. The permeability of the magnetic core 3 is lowered when the magnetic core 3 is magnetized by the above-mentioned leakage magnetic flux.

Figure 9:
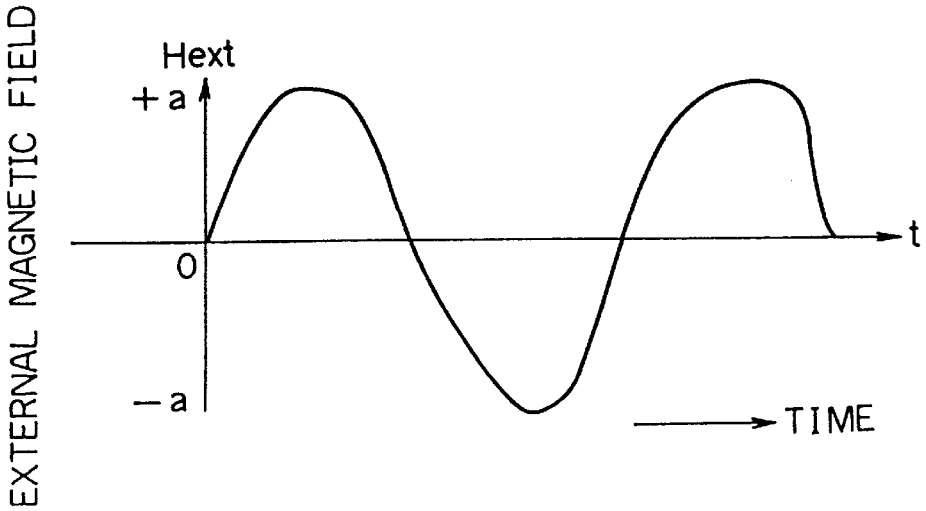
FIG. 9 is a view showing a change with time in a leakage magnetic field from a medium.
Figure 10:
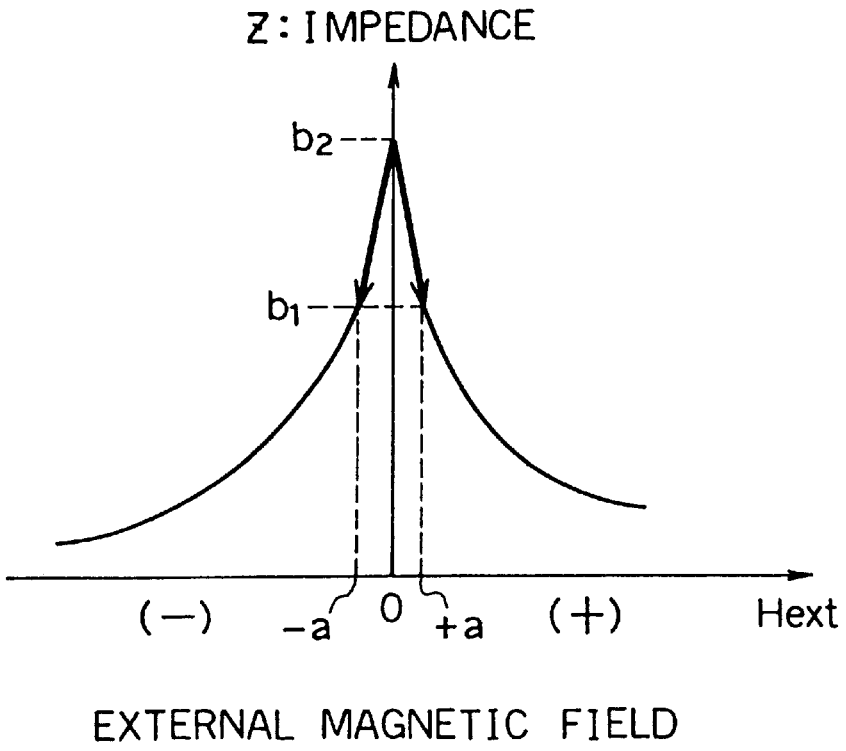
FIG. 10 is a view showing the relationship between an external magnetic field and the impedance of a conductive wire 4 when no bias magnetic field is applied.

On the other hand, the constant current of a 600 MHz carrier signal is supplied from the carrier signal generator 42 shown in FIG. 8. A signal voltage V across the terminals 5 and 6 is represented by a relational expression of V=ZI (wherein I is constant), and the value of the signal voltage V is determined by an impedance Z across the terminals 5 and 6. When the permeability of the magnetic core 3 is lowered, impedance Z is also lowered. In other words, when a leakage magnetic field from the magnetic recording medium 91 is large, the impedance Z becomes small; when the leakage magnetic field is small, the impedance Z becomes large. Let's assume that the intensity of the leakage magnetic field (external magnetic field) of the magnetic recording medium 91, having been read by the magnetic head 90, changes in the range of −a to +a as shown in FIG. 9. The − and + polarities indicate the directions of the intensity of the leakage magnetic field. In this case, as shown in FIG. 10, the impedance Z takes a large value $b_2$ when the intensity of the leakage magnetic field from the magnetic recording medium, that is, the intensity of an external magnetic field Hext, is 0. When the intensity of the leakage magnetic field is −a or +a, the intensity of the external magnetic field Hext takes a small value $b_1$.

Figure 11:
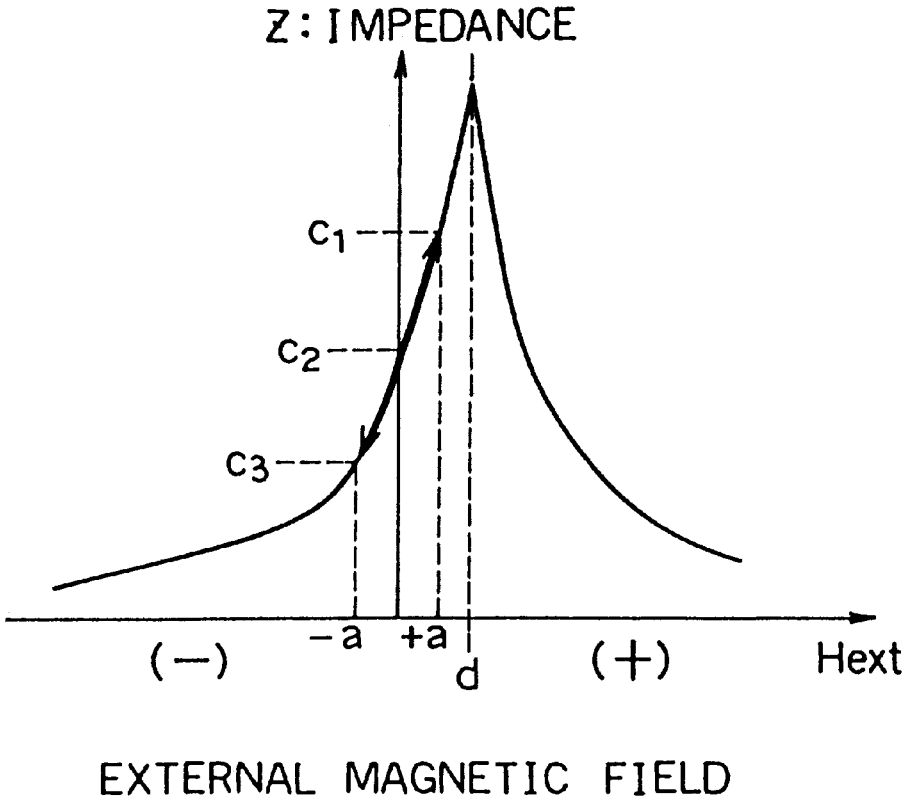
FIG. 11 is a view showing the relationship between the external magnetic field and the impedance of the conductive wire 4 when a bias magnetic field is applied.

In accordance with the characteristic shown in FIG. 10, the impedance value is inversely proportional to the intensity of the leakage magnetic field from the record track 92. However, the impedance value does not change depending on the polarity of magnetization on the record track 92. More specifically, even if the polarity of magnetization on the record track 92 is different, when the amount of the magnetic flux passing through the magnetic core 3 is not changed, the signal voltage across the terminals 5 and 6 remains unchanged. Accordingly, if the condition remains unchanged, record magnetization cannot be reproduced no matter how the signal is processed. Therefore, the magnetic core 3 is magnetized so as to be biased in one direction so that the impedance value changes depending on the polarity of the record magnetization. More specifically, a DC bias is applied by flowing a direct current through the conductive wire 4 passing through the third magnetic core 3 shown in FIG. 1. This generates a DC magnetic field around the conductive wire 4, whereby the magnetic core 3 can be magnetized in a predetermined direction. As a result, the signal voltage across the terminals 5 and 6 changes depending on the polarity of the record magnetization. FIG. 11 is a view showing the relationship between the impedance Z and the intensity of the external magnetic field Hext when a bias magnetic field having an intensity of "d" and a polarity of "−" is applied. In comparison with FIG. 10, it is found that the curve shown in FIG. 11 is shifted 2 rightward from the position shown in FIG. 10 by the amount of the intensity "d" of the bias magnetic field. When the intensity of the leakage magnetic field from the magnetic recording medium is −a, the impedance Z takes the minimum value $c_3$. When the intensity of the leakage magnetic field is zero, the impedance Z takes an intermediate value $c_2$. When the intensity of the leakage magnetic field is +a, the impedance Z takes the maximum value $c_1$. In other words, the impedance Z takes a value depending on the polarity of the external magnetic field.

As described above, a voltage changes depending on the impedance Z which changes depending on the external magnetic field and the carrier signal current, and the voltage is delivered across the terminals 5 and 6.

Since the magnetic core 3 sequentially scans record magnetization portions having different polarities and lengths, the change in the voltage across the terminals 5 and 6 becomes an amplitude-modulated wave (hereinafter referred to as AM wave) which has the 600 MHz carrier signal current as a carrier. This AM wave is demodulated as a reproduction signal by the reproduction signal detection circuit 76, and delivered to the reproducing amplifier 77. The reproducing amplifier 77 amplifies the demodulated reproduction signal and delivers the signal to the reproduction signal processing circuit 78. The reproduction signal processing circuit 78 converts the reproduction signal to a desired output signal and delivers the signal from the output terminal 79.

[Fourth Embodiment]

A method of producing a perpendicular magnetic recording medium in accordance with a fourth embodiment of the present invention is described below referring to FIG. 12 and FIG. 13.

<Common Steps>

Figure 12:
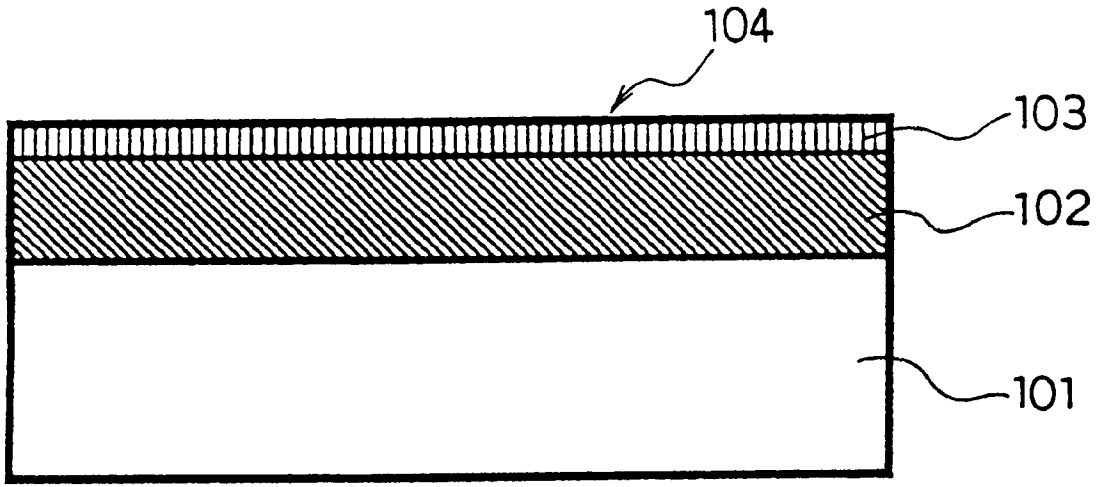
FIG. 12 is a sectional view showing a perpendicular magnetic recording medium common to fourth, fifth and sixth embodiments of the present invention.
Figure 13:
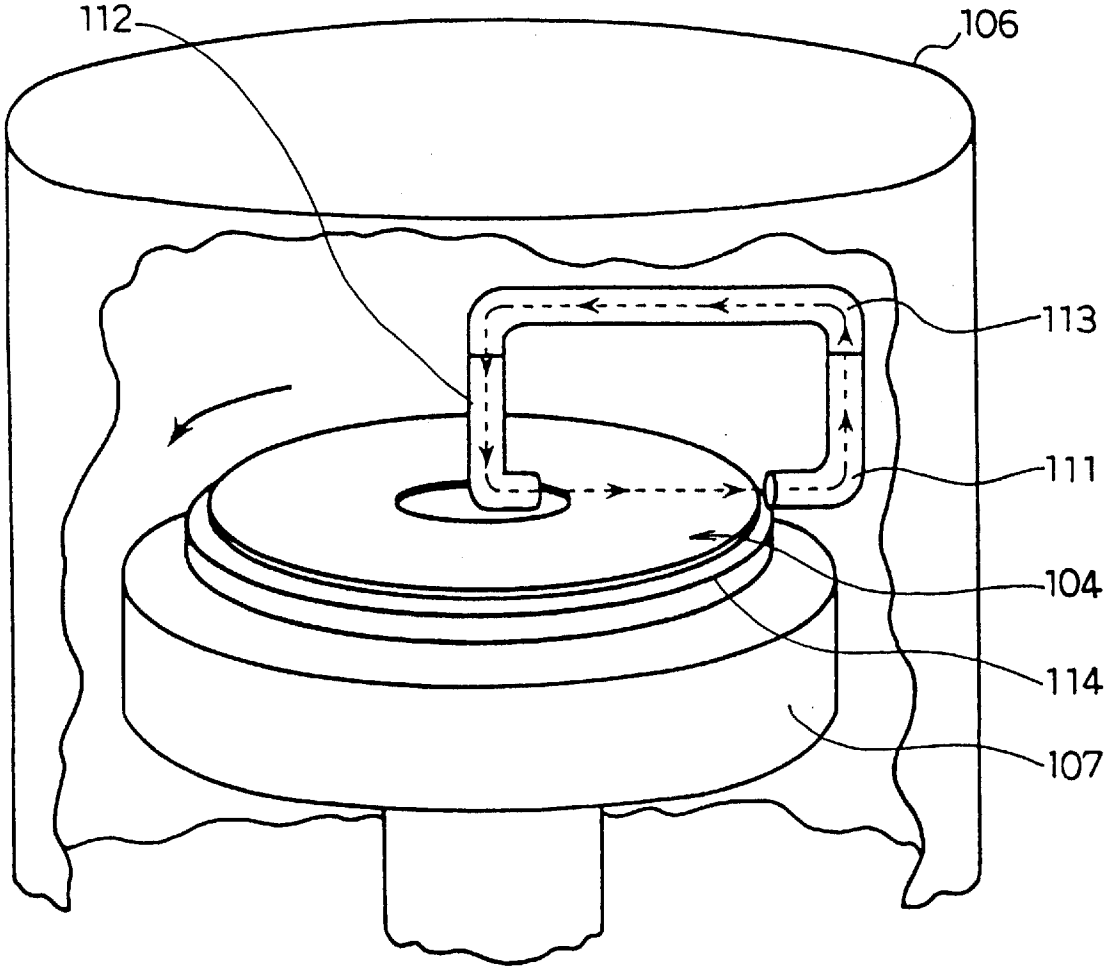
FIG. 13 is a perspective view illustrating an aftertreatment apparatus in accordance with a fourth embodiment of the present invention.

FIG. 12 is a sectional view showing a perpendicular magnetic recording medium 104 of the present invention. As shown in FIG. 12, a soft magnetic film 102 (amorphous film) used as a foundation layer is provided on a nonmagnetic substrate 101 made of a nonmagnetic substance. A perpendicular recording film 103 is formed on the soft magnetic film 102. The nonmagnetic substrate 101 is a disc-like glass substrate having a diameter of 2.5 inches for example. As the soft magnetic film 102, an amorphous alloy (Co—Zr—Ta) including cobalt, zirconium and tantalum is formed by sputtering. As the perpendicular recording film 103, an alloy (Co—Cr—Ta) including cobalt, chromium and tantalum is formed by sputtering. The conditions of sputtering are as follows: the temperature of the nonmagnetic substrate 101 is 200° C., the pressure of sputtering gas (argon gas) is 1.2 mTorr, and electric power is 2000 W. The Co—Zr—Ta film is formed to have a thickness of 1 $\mu$m, and the Co—Cr—Ta film is formed to have a thickness of 0.1 $\mu$m. The above-mentioned steps are common to fourth, fifth and sixth embodiments. In the present embodiment, it is desired that the Co—Zr—Ta film is formed by sputtering by using a target material containing Co, Zr and Ta at ratios of 90%, 5.5% and 4.5%, respectively. Furthermore, it is desired that the Co—Cr—Ta film is formed by sputtering by using a target material including Co, Cr and Ta at ratios of 78%, 17% and 5%, respectively. The films formed by sputtering by using the above-mentioned target materials include the elements in ratios nearly equal to the above-mentioned ratios.

The perpendicular magnetic recording medium 104 (hereinafter referred to as disc) having been produced as described above is subjected to an aftertreatment in accordance with methods described below.

<Steps Specific to the Fourth Embodiment>

The disc in accordance with the fourth embodiment is subjected to an aftertreatment as described below. In FIG. 13, the disc 104 made by the above-mentioned common steps is placed on a circular plate 114 in a chamber 106 which is heated to 100° C. and has atmospheric pressure. The circular plate 114 is heated by a heater 107 rotated by a rotating mechanism (not shown), and the temperature of the heater 107 is controlled to 150° C. by a thermostat built in the heater 107. Magnets 111 and 112 are magnetically connected to each other via a yoke 113. The magnet 111 is disposed at a position along the outer circumference of the disc 104, and the magnet 112 is disposed at a position along the inner circumference of the disc 104. The circular plate 114 on which the disc 104 is placed is rotated while a magnetic field intensity of 100 oersteds is applied in the radial direction of the disc 104. By this processing, magnetic anisotropy is generated at the soft magnetic film 102 of the disc 104, and the axis of hard magnetization of the soft magnetic film 102 is aligned in the direction along the circumference of the disc 104. Although permanent magnets are used for the magnets 111 and 112 of the fourth embodiment, electric magnets can also be used instead.

[Fifth Embodiment]

Figure 14:
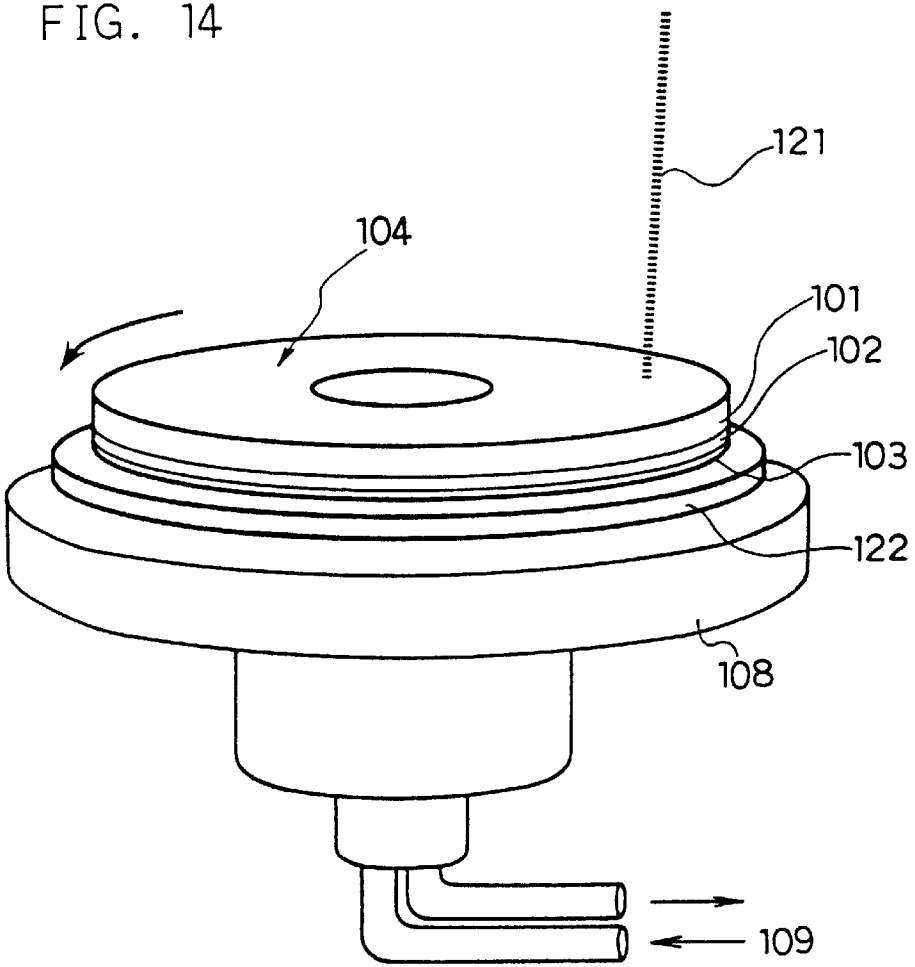
FIG. 14 is a perspective view illustrating an aftertreatment apparatus in accordance with a fifth embodiment of the present invention.

After the above-mentioned common steps, the disc in accordance with the fifth embodiment is subjected to an aftertreatment as described below. In FIG. 14, the disc 104 is placed on a circular plate 122 with the nonmagnetic substrate 101 of the disc 104 directed upward. Next, an Ar laser beam 121 is applied to the nonmagnetic substrate 101 so as to heat a specific portion (a portion for a marker indicating a rotation position on a recording disc, for example) of the soft magnetic film 102 (amorphous film) to the Co—Zr—Ta crystallization temperature range of 400 to 450° C.

Figure 15:
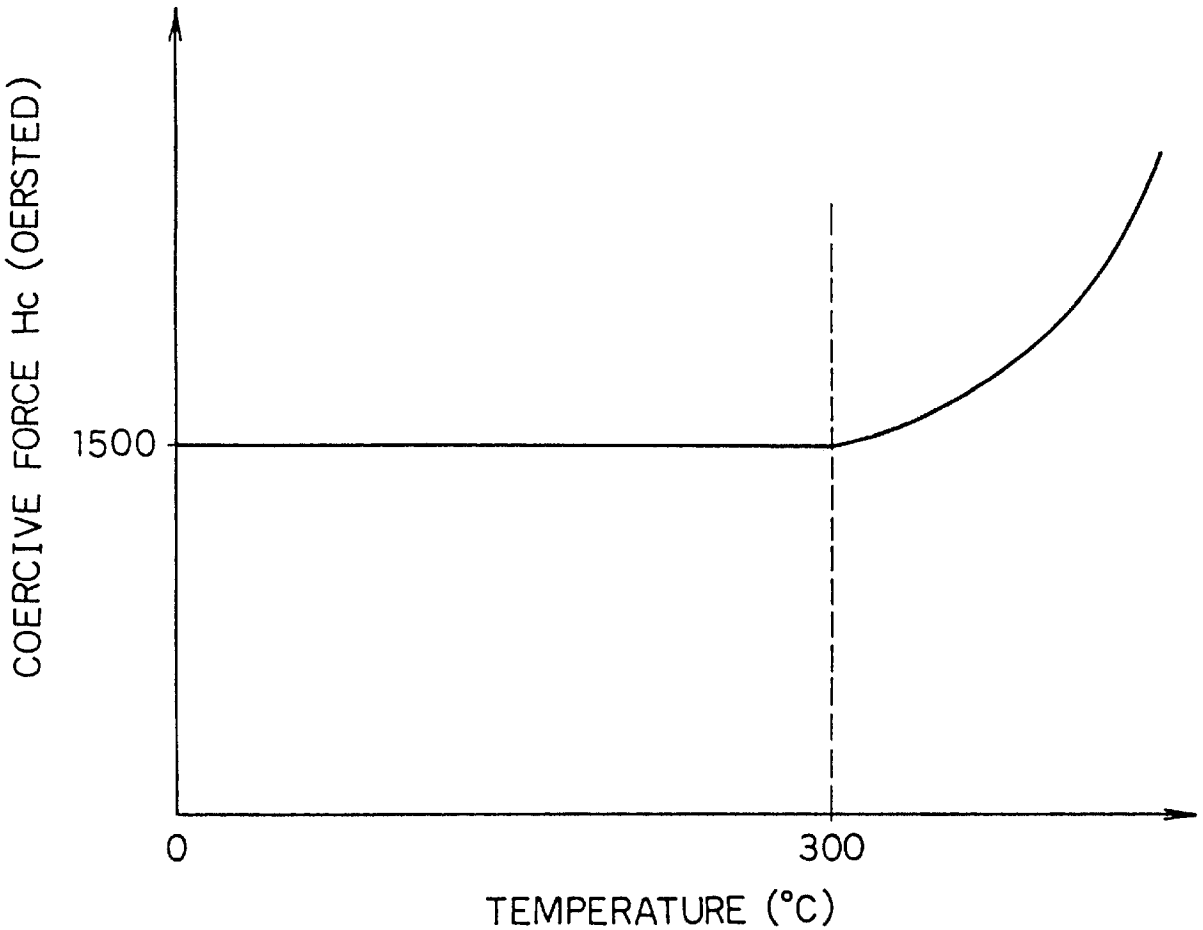
FIG. 15 is a graph showing the relationship between the temperature and the coercive force Hc of the perpendicular recording film made of Co—Cr—Ta in the perpendicular magnetic recording medium in accordance with the embodiment of the present invention.

FIG. 15 is a graph showing the relationship between temperature and coercive force Hc when a sample including only Co—Cr—Ta as the material of the perpendicular recording film 103 is heat-treated for 60 minutes under a varying temperature condition in an experimental furnace. An experiment by the inventors has clarified for the first time that when the sample is heated to a high temperature of 300° C. or more, the characteristics of the crystal thereof change, and the coercive force Hc increases and varies partially as shown in FIG. 15. This significant increase in the coercive force results in increase in magnetic energy during recording, and is undesirable for a perpendicular magnetic recording medium. The present invention has been completed by utilizing the results of the experiment. By using a structure described below, an aftertreatment is conducted so that the coercive force Hc does not increase more than necessary but is maintained at a constant value of about 1500 oersteds. In FIG. 14, the circular plate 122 making contact with the perpendicular recording film 103 is provided with a water-cooling device 108. By flowing cooling water 109 to the water-cooling device 108, the temperature of the perpendicular recording film 103 is maintained at 300° C. or less at all times. Therefore, even when the soft magnetic film 102 is heated to the crystallization temperature range of 400 to 450° C. by the application of the laser beam 121, the temperature of the perpendicular recording film 103 is maintained at 300° C. or less. This prevents the coercive force Hc from increasing to a large value of 1500 oersteds or more.

Figure 16:
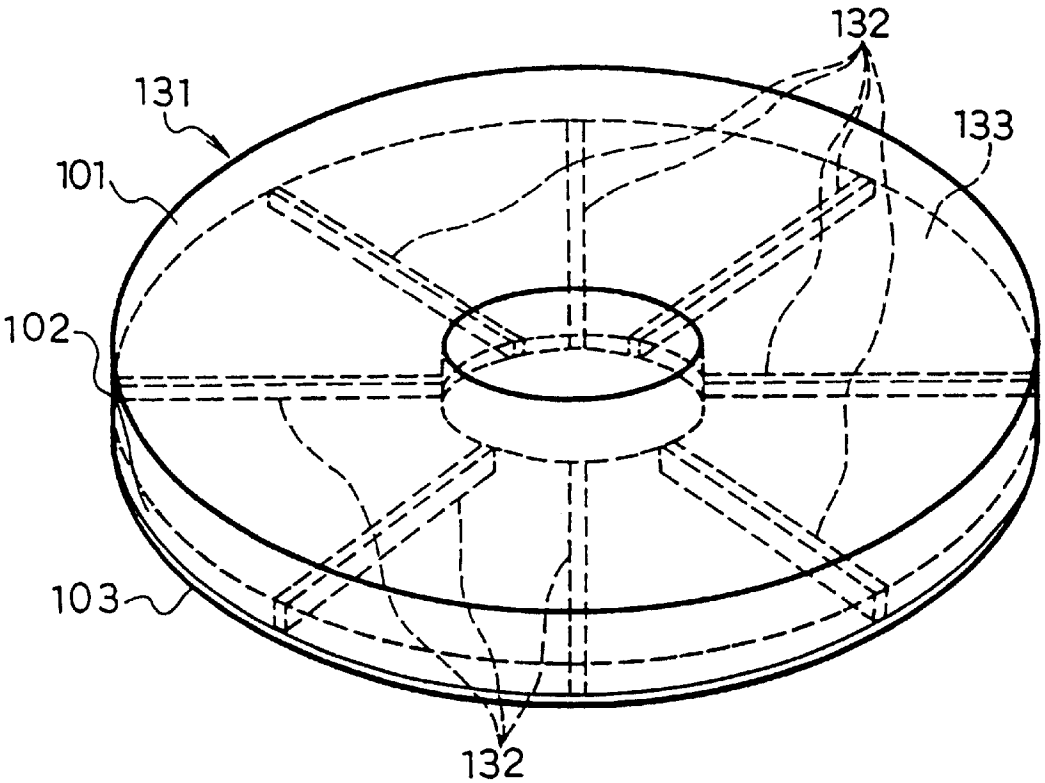
FIG. 16 is a perspective view showing a disc subjected to the aftertreatment in accordance with the fifth embodiment of the present invention.

Laser application means is structured so that the laser beam 121 can move in the radial direction of the disc 104. In combination with the rotation of the circular plate 122, the laser beam can crystallize any position on the amorphous soft magnetic film 102. The crystallized soft magnetic film 102 becomes nearly nonmagnetic. This method can provide a disc 131 having crystallized regions 132 of the soft magnetic film in the radial directions from the center of the disc as shown in FIG. 16.

Figure 17A:
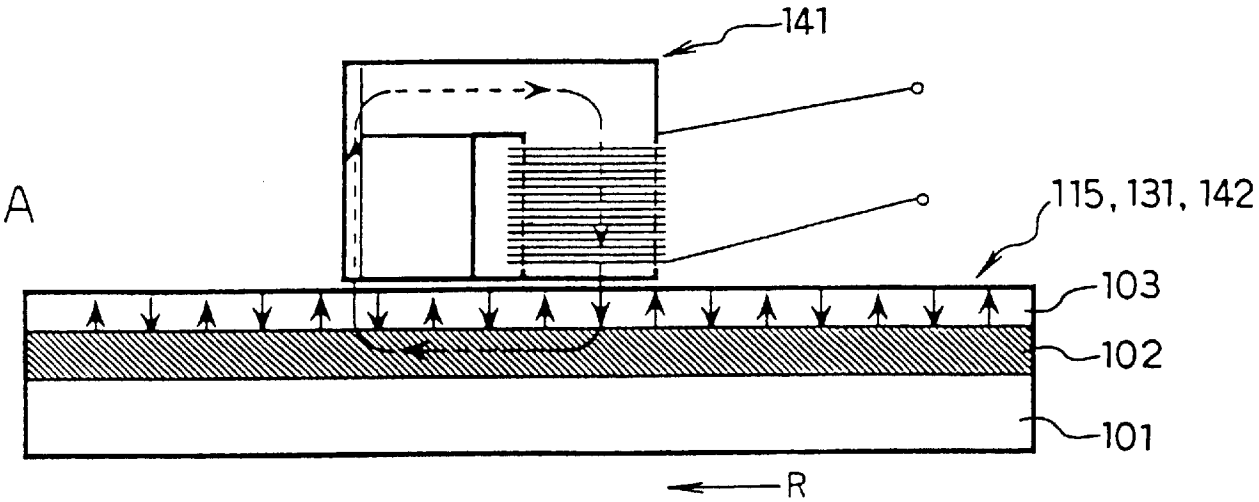
FIG. 17A is a side view showing the structure of a disc recording apparatus in accordance with the present invention.
Figure 17B:
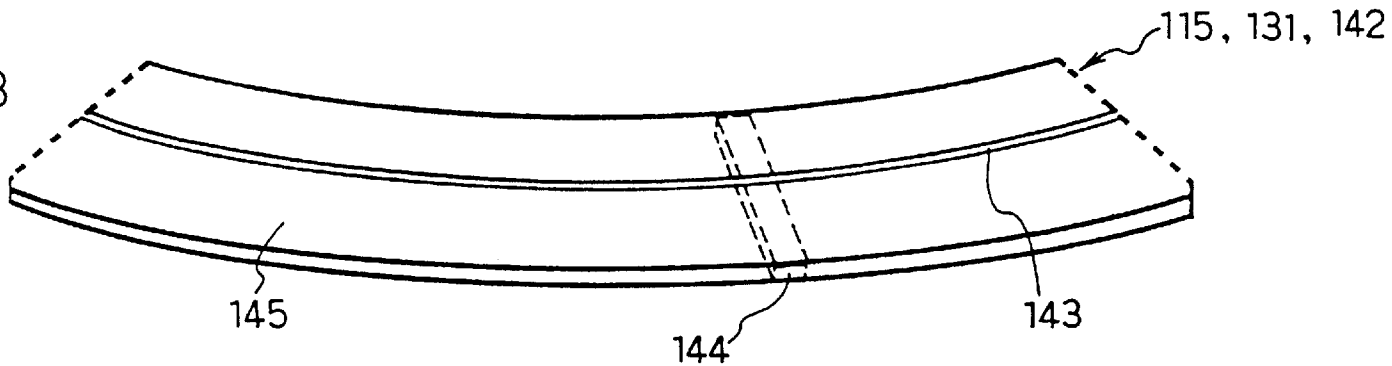
FIG. 17B is a perspective view showing part of a disc having a recorded pattern.

Recording was carried out by using three kinds of discs: a disc 115 having been subjected to the aftertreatment in accordance with the fourth embodiment; the disc 131 having been subjected to the aftertreatment in accordance with the fifth embodiment; a disc 142 not having been subjected to any aftertreatment, that is, the axis of hard magnetization of the soft magnetic film 102 of the disc 142 not aligned in a constant direction. More specifically, a signal having a wavelength of 0.5 $\mu$m was recorded by a perpendicular recording head 141 along the circumference of a recording pattern 143 shown in FIG. 17B while the disc 115, 131 or 142 is rotated in the direction indicated by arrow R as shown in FIG. 17A. As a result, the level of the reproduction signal on the disc 115 having been subjected to the aftertreatment in accordance with the fourth embodiment was higher by 6 dB than the reproduction signal on the disc 142 not having been subjected to any aftertreatment. This increase was obtained as a result of aligning the axis of hard magnetization of the soft magnetic film 102 in the direction along the circumference of the disc 115 by providing a magnetic field in the radial directions of the disc 115 during the treatment in accordance with the fourth embodiment. The permeability of a magnetic film having magnetic anisotropy in the direction of the axis of hard magnetization thereof is higher than that in the direction of the axis of easy magnetization. Therefore, the magnetic field of the perpendicular recording film 103 during recording in the direction of the axis of hard magnetization is more intense than that in the axis of easy magnetization. This increases residual magnetism and raises the level of the reproduction signal.

Figure 18:
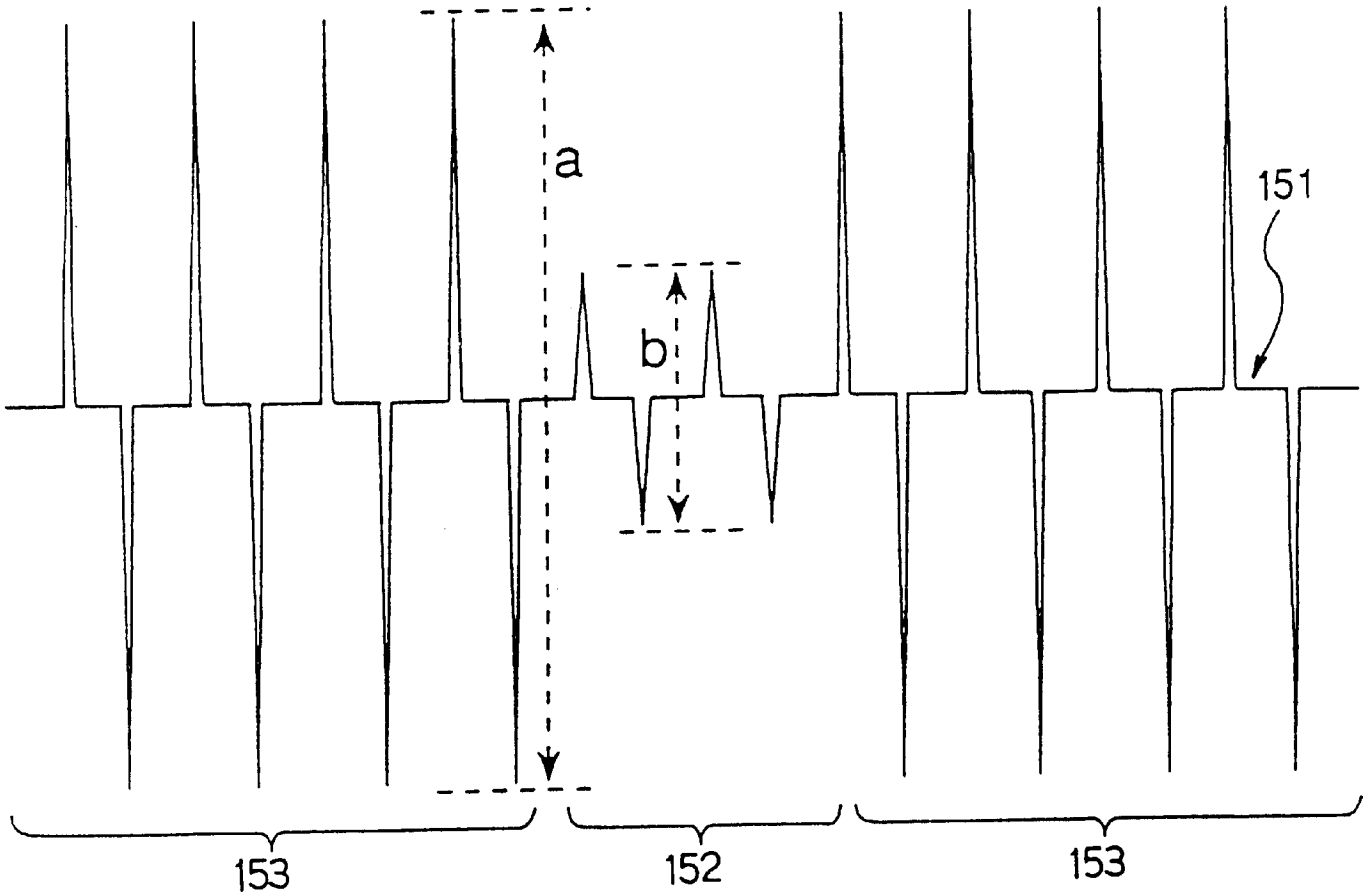
FIG. 18 is a waveform diagram of a reproduction signal obtained by reproducing a signal recorded on the disc subjected to the aftertreatment in accordance with the fifth embodiment of the present invention.

FIG. 18 shows a reproduction signal 151 recorded on the disc 131. It was found that the peak-to-peak output "b" of a reproduction signal 152 in the crystallized regions 132 of the soft magnetic film 102 shown in FIG. 16 was lower by 20 dB than the peak-to-peak output "a" of a reproduction signal 153 in the amorphous regions 133.

In the present embodiment, the above-mentioned difference of 20 dB was generated between the two reproduction signals when the soft magnetic film was amorphous and when portions of the amorphous region of the soft magnetic film were crystallized. The difference of 20 dB is a sufficient output difference for a servo signal. Even when the portions of the amorphous region are crystallized, no pits or projections are generated on the surface of the disc. Therefore, the surface of the disc can be maintained smooth. Even during recording, the crystallized regions 132 of the soft magnetic film was able to be detected and used for tracking or the like. Furthermore, although a signal having a wavelength of 0.5 $\mu$m was recorded in the above-mentioned embodiment, it was experimentally recognized that the difference of 20 dB was generated between the reproduction signal at the amorphous regions and the reproduction signal at the crystallized regions even when a signal having a wavelength range of 5 to 0.2 $\mu$m was recorded. Although Ar laser was used in the fifth embodiment, it is effective to use short-wave laser, such as blue laser, in order to make the crystallized portions of the soft magnetic film 102 smaller.

[Sixth Embodiment]

A sixth embodiment is described below referring to FIG. 19 and FIG. 20.

The sixth embodiment is an application of the above-mentioned results to servo control on a predetermined track of a disc.

Figure 19:
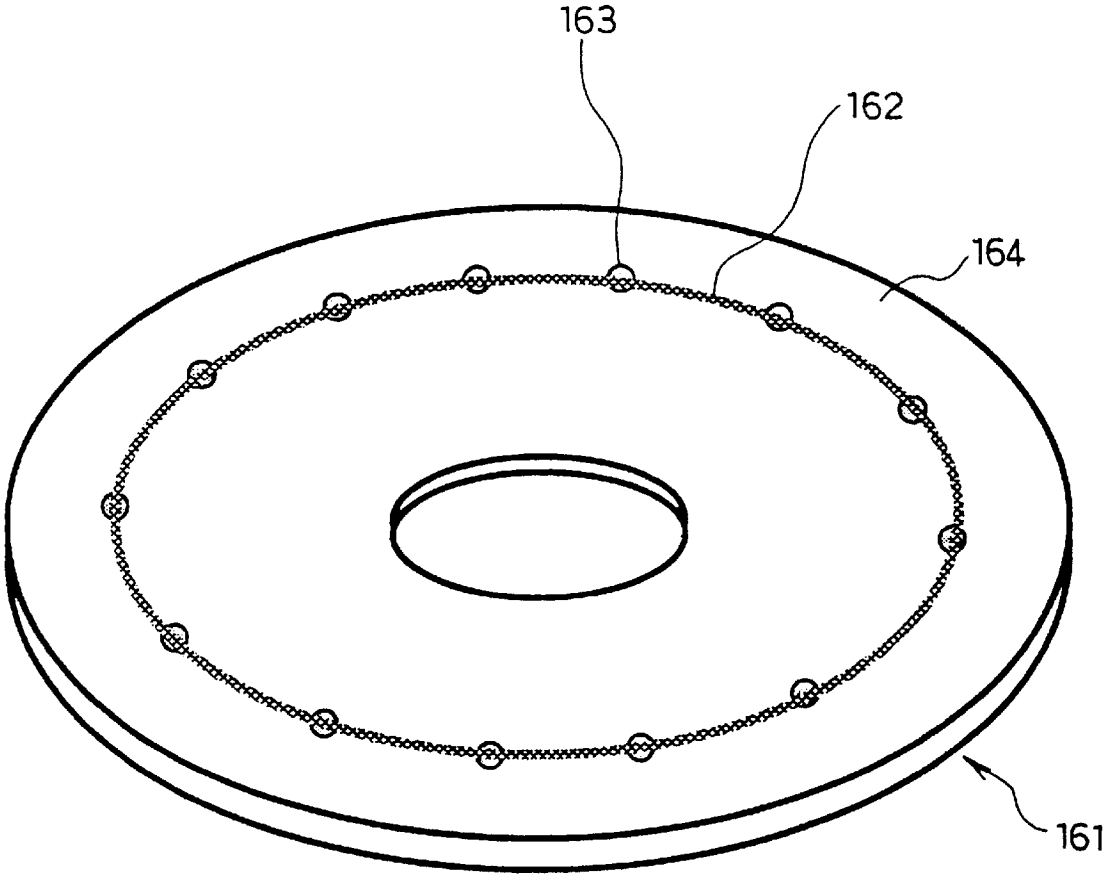
FIG. 19 is a perspective view showing a disc in accordance with a sixth embodiment of the present invention.

In a disc 161 shown in FIG. 19, circular markers 163 for tracking are formed on a circle 162 at predetermined intervals by applying a YAG laser beam to the soft magnetic amorphous film of the disc 161 in advance. The marker 163 is a crystallized region having a diameter of about 3 μm formed in the amorphous film 102, and is nearly nonmagnetic. Signals are recorded and reproduced on the disc 161 by using a magnetic recording and reproducing apparatus shown in FIG. 20.

[Detailed Description of Apparatus]

Figure 20:
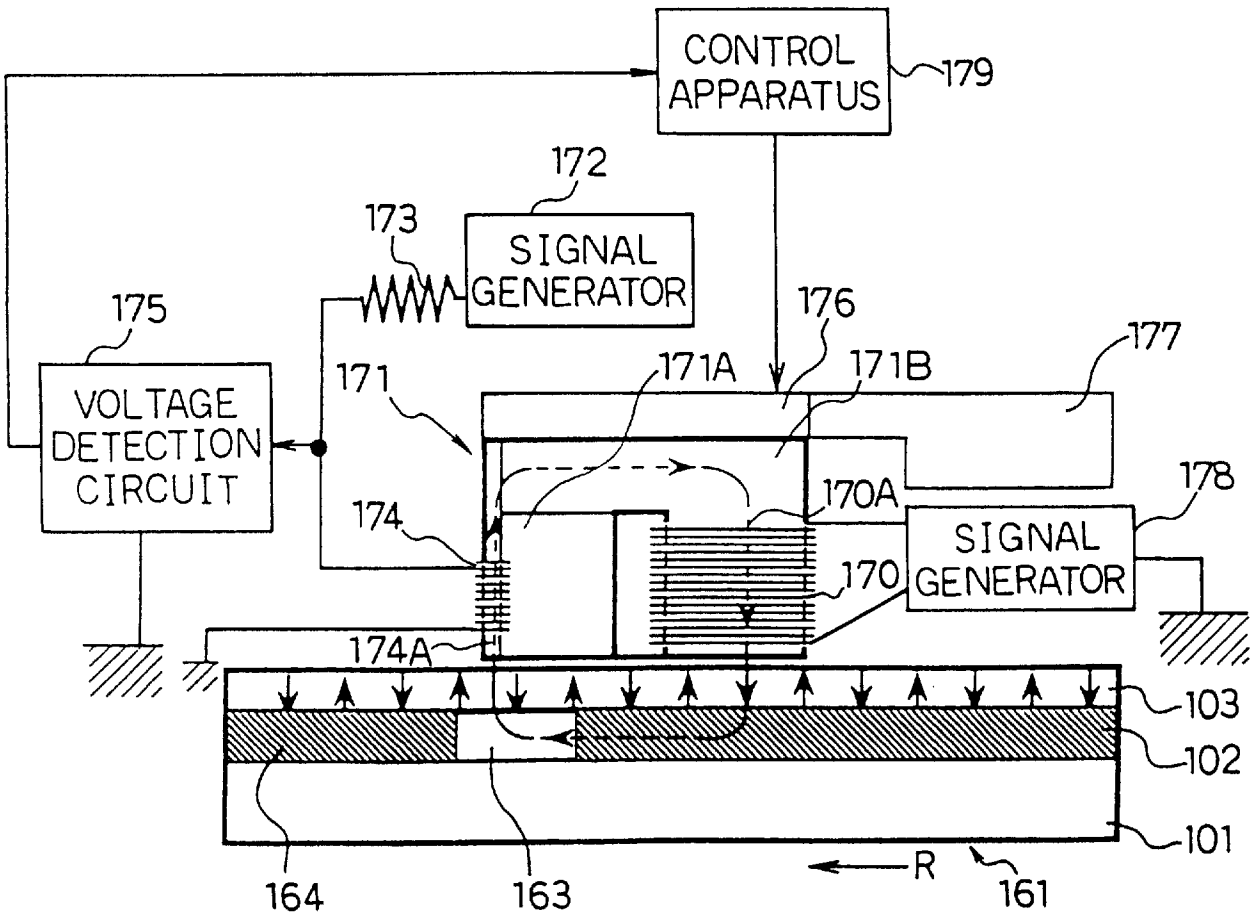
FIG. 20 is a side view showing a magnetic recording and reproducing apparatus for recording and reproducing signals on the disc in accordance with the sixth embodiment of the present invention.

Referring to FIG. 20, a perpendicular head 171 is supported by a head support portion 177 via head drive means 176. The head drive means 176 positions the perpendicular head 171 at a predetermined position over the perpendicular recording film 103 and controls the distance between the perpendicular recording film 103 and the perpendicular head 171 so that the distance has a predetermined value.

In addition, a first magnetic core 174A of the perpendicular head 171 is provided with a first winding 174 for detecting the markers 163 depending on a change in impedance. The second magnetic core 170A of the perpendicular head 171 is provided with a second winding 170 for recording and reproducing signals. The magnetic core 174A of the perpendicular head 171 is a magnetic core including soft magnetic thin films provided on the surfaces of the glass substrate 171A and the magnetic yoke 171B. The winding 174 is formed around the magnetic core 174A comprising the soft magnetic thin films by a well-known method, such as the photolithograph method. The perpendicular head 171 is positioned by using the markers 163.

At the time of signal writing, a signal having a high frequency, 500 MHz for example, out of the frequency band of the signal to be recorded or reproduced, is applied from a signal generator 172 to the winding 174 of the perpendicular head 171 via a resistor 173. It is desirable that the frequency of the signal should be in the range of 250 to 800 MHz. When the magnetic core 174A faces the marker 163 in the crystallized region, and the magnetic core 170A faces the amorphous region 164 of the soft magnetic film via the perpendicular recording film 103, the impedance of the winding 174 is lowered because the permeability at the marker 163 is low. The reduction in the impedance of the winding 174 is detected by reduction in the detection output of a voltage detection circuit 175. When both magnetic cores 174A and 170A face the amorphous region 164, the impedance of the winding 174 increases because the permeability of the amorphous region 164 is high. This results in increase in the detection output of the voltage detection circuit 175. By applying this principle to tracking, it possible to carry out tracking servo control during recording.

When the magnetic core 174A passes the marker 163 as shown in FIGS. 21A and 21B during reproduction, change in the impedance of the winding 174 is detected as change in the detection output 182 of the voltage detection circuit 175. A detection output 183 can be obtained by envelop-detecting the detection output 182. When the locus 181 (reproduction track) of the magnetic core 174A passes the center of the marker 163 as shown in FIG. 21A, the time width A of the detection output 183 becomes a relatively large value corresponding to the diameter of the marker 163 as shown in FIG. 21E. However, when a locus 181 of the magnetic core 174A passes a fringe portion of the marker 163 as shown in FIG. 21B, the time width B of the detection output 183 is smaller than the time width A as shown in FIG. 21F. Therefore, by carrying out control so that the time width A is larger than the time width B and has the maximum value, tracking can be set to the best condition. The track width of the perpendicular head 171 used in the present embodiment is 1 μm, for example.

Although the disc 161, a disc-like recording medium, is used as a perpendicular magnetic recording medium in the present embodiment, record and reproduction can be accomplished in the same way by using other forms of recording media, such as a card and a chip. In addition, although Co—Cr—Ta is formed into a film having a thickness of 0.1 μm as the perpendicular recording film 103 in the present embodiment, record and reproduction and servo control can be accomplished in the same way even when the film thickness is changed in the range of 0.01 to 1 μm. Furthermore, a cobalt-chromium (Co—Cr) alloy or the like can be used for the perpendicular magnetic recording film. Although Co—Zr—Ta is formed into a film having a thickness of 1 μm as the soft magnetic film 102, the film thickness can be changed in the range of 0.1 to 5 μm. Moreover, a film made of Co—Zr—Nb, Ni—Fe or FeN can also be used as the soft magnetic film 102. Beside, a film made of an amorphous material other than those described above, such as Co—Zr—Ta, can be used as an amorphous film.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. A magnetic [recording and reproducing] *sensing* apparatus comprising:

[a magnetic head comprising:]

a first magnetic core and a second magnetic core each including a soft magnetic film,[one end of each core being for facing a magnetic recording medium and disposed with a predetermined distance therebetween,]

a third magnetic core including a soft magnetic film, disposed between said first and second magnetic cores, [and magnetically connected to the other ends of said first and second magnetic cores,]

a conductive wire passing through said third magnetic core while being insulated from said third magnetic core, said conductive wire flowing a DC-biased high-frequency constant current [to reproduce information recorded in said magnetic recording medium], and

[a winding of conductor wound around said third magnetic core, said winding of conductor applied with a signal to be recorded in said magnetic recording medium, and]

carrier signal application means for applying the DC-biased high-frequency constant current across said conductive wire.

2. A magnetic [recording and reproducing] *sensing* apparatus in accordance with claim 1, wherein said third magnetic core comprises a first soft magnetic film and a second soft magnetic film, and the area on an end surface of each of said first and second soft magnetic films for facing [said] *a* magnetic [recording medium] *field* is smaller than the area on each respective opposite end surface thereof.

3. A magnetic [recording and reproducing] *sensing* apparatus in accordance with claim 1, wherein the thickness of said third magnetic core is smaller than the thicknesses of said first magnetic core and said second magnetic core.

4. A magnetic [recording and reproducing] *sensing* apparatus in accordance with claim 1, further comprising:

a high-frequency voltage detection means for detecting a high-frequency voltage, the high-frequency voltage changing depending on a magnetic field defined by a bias magnetic field, caused by said DC-biased high-frequency constant current superimposed on an external magnetic field, [caused by a magnetic recording medium,] and

[an] AM demodulation means for demodulating said detected high-frequency voltage.

* * * * *